(12) United States Patent
Kolb et al.

(10) Patent No.: US 9,139,794 B2
(45) Date of Patent: Sep. 22, 2015

(54) PROCESS FOR THE PRODUCTION OF POLYMERIC COMPOSITIONS USEFUL AS OIL MODIFIERS

(75) Inventors: Rainer Kolb, Kingwood, TX (US); Phillip T. Matsunaga, Houston, TX (US); Periagaram S. Ravishankar, Kingwood, TX (US); Lisa B. Stefaniak, Houston, TX (US); Quintin Paul Ward Costin, Baton Rouge, LA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 420 days.

(21) Appl. No.: 13/365,698

(22) Filed: Feb. 3, 2012

(65) Prior Publication Data

US 2013/0203641 A1 Aug. 8, 2013

(51) Int. Cl.

| | |
|---|---|
| *C10L 1/16* | (2006.01) |
| *C08F 2/00* | (2006.01) |
| *C10M 143/00* | (2006.01) |
| *C10M 143/08* | (2006.01) |
| *C08L 23/08* | (2006.01) |

(52) U.S. Cl.
CPC .......... *C10M 143/00* (2013.01); *C08L 23/0815* (2013.01); *C10M 143/08* (2013.01); *C08L 2308/00* (2013.01); *C08L 2314/06* (2013.01); *C10M 2205/028* (2013.01); *C10M 2205/22* (2013.01); *C10N 2220/021* (2013.01); *C10N 2220/033* (2013.01); *C10N 2270/00* (2013.01)

(58) Field of Classification Search
CPC . C10M 145/02; C10M 143/02; C10M 143/08
USPC .............. 508/591, 131, 200; 526/65
See application file for complete search history.

(56) References Cited

U.S. PATENT DOCUMENTS

| | | |
|---|---|---|
| 3,778,375 A | 12/1973 | Braid et al. |
| 3,779,928 A | 12/1973 | Schlicht |
| 3,852,205 A | 12/1974 | Kablaoui et al. |
| 3,879,306 A | 4/1975 | Kablaoui et al. |
| 3,932,290 A | 1/1976 | Koch et al. |
| 3,933,659 A | 1/1976 | Lyle et al. |
| 4,028,258 A | 6/1977 | Kablaoui et al. |
| 4,105,571 A | 8/1978 | Shaub et al. |
| 4,176,074 A | 11/1979 | Coupland et al. |
| 4,344,853 A | 8/1982 | Gutierrez et al. |
| 4,464,493 A | 8/1984 | Joffrion |
| 4,542,199 A | 9/1985 | Kaminsky et al. |
| 4,752,597 A | 6/1988 | Turner |
| 4,871,705 A | 10/1989 | Hoel |
| 4,892,851 A | 1/1990 | Ewen et al. |
| 5,017,714 A | 5/1991 | Welborn, Jr. |
| 5,026,798 A | 6/1991 | Canich |
| 5,055,438 A | 10/1991 | Canich |
| 5,057,475 A | 10/1991 | Canich et al. |
| 5,068,047 A | 11/1991 | Chung et al. |
| 5,120,867 A | 6/1992 | Welborn, Jr. |
| 5,132,262 A | 7/1992 | Rieger et al. |
| 5,198,401 A | 3/1993 | Turner et al. |
| 5,243,001 A | 9/1993 | Winter et al. |
| 5,264,405 A | 11/1993 | Canich |
| 5,278,119 A | 1/1994 | Turner et al. |
| 5,278,264 A | 1/1994 | Spaleck et al. |
| 5,296,434 A | 3/1994 | Karl et al. |
| 5,304,614 A | 4/1994 | Winter et al. |
| 5,324,800 A | 6/1994 | Welborn, Jr. et al. |
| 5,334,677 A | 8/1994 | Razavi et al. |
| 5,350,723 A | 9/1994 | Neithamer et al. |
| 5,387,568 A | 2/1995 | Ewen et al. |
| 5,391,617 A | 2/1995 | Olivier et al. |
| 5,391,629 A | 2/1995 | Turner et al. |
| 5,416,228 A | 5/1995 | Ewen et al. |
| 5,449,651 A | 9/1995 | Reddy et al. |
| 6,319,998 B1 * | 11/2001 | Cozewith et al. ............... 526/65 |
| 7,402,235 B2 | 7/2008 | Huang |
| 2004/0034168 A1 | 2/2004 | Schauder |
| 2009/0036725 A1 * | 2/2009 | Wu et al. .................. 585/521 |
| 2010/0273692 A1 * | 10/2010 | Kolb et al. .................. 508/591 |
| 2010/0273693 A1 | 10/2010 | Datta et al. |

FOREIGN PATENT DOCUMENTS

| | | |
|---|---|---|
| EP | 0 277 003 | 8/1988 |
| EP | 0 277 004 | 8/1988 |

(Continued)

OTHER PUBLICATIONS

U.S. Appl. No. 60/243,192, filed Oct. 25, 2000, Friedersdorf.
U.S. Appl. No. 61/173,528, filed Apr. 28, 2009, Kolb et al.
Ewen et al., "Syndiospecific Propylene Polymerizations with Group IVB Metallocenes," J. Am. Chem. Soc., vol. 110 (18), 1988, pp. 6255-6256.

*Primary Examiner* — Prem C Singh
*Assistant Examiner* — Francis C Campanell
(74) *Attorney, Agent, or Firm* — Jennifer A. Schmidt

(57) ABSTRACT

Provided are processes for making polymer compositions, especially those with reduced or no gel formation in lubricating oils as identified by rheological and visual gel tests and which are useful as viscosity modifiers. The processes described herein aim to achieve this objective by adjusting the concentrations of the hydrogen feed(s) in the first and/or second polymerization reaction zones, preferably such that (a) the hydrogen feed concentration in the first polymerization reaction zone is 0.0-1.0 wt %, based on total weight of feed(s) of hydrogen, ethylene monomer, α-olefin comonomer, and solvent into the first polymerization reaction zone, and/or (b) the hydrogen feed concentration in the second polymerization reaction zone is 0.0-0.5 wt %, based on total weight of feed(s) of hydrogen, ethylene monomer, α-olefin comonomer, and solvent into the second polymerization reaction zone.

26 Claims, No Drawings

(56) References Cited

FOREIGN PATENT DOCUMENTS

| | | |
|---|---|---|
| EP | 0 426 637 | 5/1991 |
| EP | 0 427 697 | 5/1991 |
| EP | 0 495 375 | 7/1992 |
| EP | 0 500 944 | 9/1992 |
| EP | 0 520 732 | 12/1992 |
| EP | 0 570 982 | 11/1993 |
| EP | 0 573 403 | 12/1993 |
| EP | 0 612 768 | 8/1994 |
| EP | 0 638 611 | 2/1995 |
| WO | WO 92/00333 | 1/1992 |
| WO | WO 96/02244 | 2/1996 |
| WO | WO 2008/005100 | 1/2008 |
| WO | WO 2010/016847 | 2/2010 |
| WO | WO 2010/126720 | 11/2010 |
| WO | WO 2010/126721 | 11/2010 |
| WO | WO 2010/129151 | 11/2010 |
| WO | WO 2011/019474 | 2/2011 |
| WO | WO 2011/090859 | 7/2011 |
| WO | WO 2011/090861 | 7/2011 |
| WO | WO 2011/094057 | 8/2011 |
| WO | WO 2012/015572 | 2/2012 |
| WO | WO 2012/015573 | 2/2012 |
| WO | WO 2012/015576 | 2/2012 |
| WO | WO 2013/048690 | 4/2013 |

* cited by examiner

PROCESS FOR THE PRODUCTION OF POLYMERIC COMPOSITIONS USEFUL AS OIL MODIFIERS

PRIORITY

This application claims priority to U.S. non-provisional application Ser. No. 13/365,678 titled, "Polymer Compositions Having Improved Properties As Viscosity Index Improvers and Use Thereof In Lubricating Oils," filed concurrently herewith on Feb. 3, 2012.

CROSS REFERENCE TO RELATED APPLICATIONS

This application is related to U.S. Ser. No. 12/761,880 (2009EM079/2), filed Apr. 16, 2010, and U.S. Ser. No. 12/762,096 (2009EM082/2), filed Apr. 16, 2010, each of which in turn claims priority to Provisional Application No. 61/173,528 (2009EM079), filed Apr. 28, 2009 and Provisional Application No. 61/173,501 (2009EM082), filed Apr. 28, 2009, the disclosures of which are incorporated herein by reference in their entireties.

FIELD OF THE INVENTION

The present disclosure relates to processes for making polymer compositions, especially those useful as rheology modifiers. More particularly, the disclosure relates to processes for making crystallinity disperse polymer compositions useful in modifying the rheological properties of fluids.

BACKGROUND OF THE DISCLOSURE

Lubrication fluids are applied between moving surfaces to reduce friction, thereby improving efficiency and reducing wear. Lubrication fluids also often function to dissipate the heat generated by moving surfaces.

One type of lubrication fluid is a petroleum-based lubrication oil used for internal combustion engines. Lubrication oils contain additives that help the lubrication oil to have a certain viscosity at a given temperature. In general, the viscosity of lubrication oils and fluids is inversely dependent upon temperature. When the temperature of a lubrication fluid is increased, the viscosity generally decreases, and when the temperature is decreased, the viscosity generally increases. For internal combustion engines, for example, it is desirable to have a lower viscosity at low temperatures to facilitate engine starting during cold weather, and a higher viscosity at higher ambient temperatures when lubrication properties typically decline.

Additives for lubrication fluids and oils include rheology modifiers, such as viscosity index (VI) improvers. VI improving components, many of which are derived from ethylene-alpha-olefin copolymers, modify the rheological behavior of a lubricant to increase viscosity and promote a more constant viscosity over the range of temperatures at which the lubricant is used. Higher ethylene content copolymers efficiently promote oil thickening and shear stability. However, higher ethylene content copolymers also tend to aggregate in oil formulations leading to extremely viscous formulations. Aggregation typically happens at ambient or subambient conditions of controlled and quiescent cooling. This deleterious property of otherwise advantageous higher ethylene content viscosity improvers is measured by low temperature solution rheology. Various remedies have been proposed for these higher ethylene content copolymer formulations to overcome or mitigate the propensity towards the formation of high viscosity at low temperature.

It is believed that the performance of VI improvers can be substantially improved, as measured by the thickening efficiency (TE) and the shear stability index (SSI), by appropriate and careful manipulation of the structure of the VI improver. Particularly, it has been discovered that performance improves when the distribution of the monomers and the chain architecture are controlled and segregated into at least two compositionally different and/or crystallinity different polymers. These different polymers may be achieved by the use of a synthesis process that employs metallocene-based catalysts in the polymerization process.

One proposed solution is the use of compositions of amorphous and semi-crystalline ethylene-based copolymers for lubricant oil formulations. The combination of two such ethylene copolymers allows for improved thickening efficiency, shear stability index, low temperature viscosity performance and pour point, and "finishing" as pellets for easy dissolving. Traditionally, such copolymer compositions are made from mixing two polymers made from conventional vanadium based Ziegler-Natta catalyst in an extruder or solvent based process. See, e.g., U.S. Pat. Nos. 7,402,235 and 5,391,617, and European Patent 0 638,611, the disclosures of which are incorporated herein by reference.

Similar polymer compositions made with metallocene catalyzed ethylene-α-olefin copolymers can have a tendency to form gels in lubricating oils when stored at low temperatures. Such gelation of metallocene catalyzed copolymers can be observed visually when lubricating oil solutions or poly-alpha olefin (PAO) solutions containing the polymers are cycled from −15° C. to 10° C. or, alternatively, in a low temperature rheological test, where the yield stress and tan δ are measured. Yield stresses in the range of from 0 mPa to 4000 mPa are observed for metallocene catalyzed polymers in PAO solutions containing 2.4 wt % polymer at 0° C. and −15° C. and generally scale with the severity of the gels as rated by the visual gel test method. Further, values of the tan δ scale inversely with the tendency of the solutions to form gels, higher values indicating higher tendency to form non-gelling lubricating oils.

There is a need for processes for making polymer compositions suitable for use as viscosity index improvers for lubricating oils which advantageously form little or no gel at low temperatures.

SUMMARY OF THE DISCLOSURE

The present disclosure relates to processes for making polymer compositions, especially those with reduced or no gel formation in lubricating oils as identified by rheological and visual gel tests and which are useful as viscosity modifiers. The processes described herein aim to achieve this objective by adjusting the concentrations of the hydrogen feed(s) in the first and/or second polymerization reaction zones, preferably such that (a) the hydrogen feed concentration in the first polymerization reaction zone is 0.0-1.0 wt %, based on total weight of feed(s) of hydrogen, ethylene monomer, α-olefin comonomer, and solvent into the first polymerization reaction zone, and/or (b) the hydrogen feed concentration in the second polymerization reaction zone is 0.0-0.5 wt %, based on total weight of feed(s) of hydrogen, ethylene monomer, α-olefin comonomer, and the solvent into the second polymerization reaction zone.

In one embodiment, the invention provides a process for making a polymer composition comprising the steps of:

(a) feeding (i) a first ethylene monomer, (ii) a first α-olefin comonomer, (iii) a first solvent, (iv) optionally a first hydrogen (in the form of a feed stream), and (v) a first metallocene catalyst, in a first polymerization reaction zone to produce a first ethylene-α-olefin copolymer;

(b) feeding (ii) a second ethylene monomer, (ii) a second α-olefin comonomer, (iii) a second solvent, (iv) optionally a second hydrogen (in the form of a feed stream), and (v) a second metallocene catalyst, in a second polymerization reaction zone to produce a second ethylene-α-olefin copolymer; and (c) combining the first ethylene-α-olefin copolymer and the second ethylene-α-olefin copolymer to form a polymer composition, wherein the first ethylene-α-olefin copolymer has an ethylene content from about 60 to about 80 wt %, and the second ethylene-α-olefin copolymer has an ethylene content of less than about 60 wt %, and wherein the process meets at least one of the following:

(1) the first hydrogen is fed in step (a) at a first hydrogen feed concentration of 0.0-1.0 wt %, by total weight of (a)(i)-(iv) fed in step (a); and (2) the second hydrogen is fed in step (b) at a second hydrogen feed concentration of 0.0-0.5 wt %, by total weight of (b)(i)-(iv) fed in step (b).

Another aspect of the present disclosure is directed to polymer compositions made according to the processes of the invention, and lubricant compositions comprising such polymer compositions. In a preferred embodiment, the processes of the invention produce polymer compositions that comprise (a) a first ethylene-α-olefin copolymer and (b) a second ethylene-α-olefin copolymer. The first ethylene-α-olefin copolymer (a) has an ethylene content from about 60 to about 80 wt % and the second ethylene-α-olefin copolymer (b) has an ethylene content of less than about 60 wt % or less. The first ethylene-α-olefin copolymer (a) can have a Melt Flow Rate Ratio (MFRR), defined as the ratio of the MFR measured at 230° C./21.6 kg and at 230° C./2.16 kg, of greater than 30, and optionally also has a Melt Flow Rate (MFR) at least about 1.5 g/10 min measured by ASTM D 1238 condition L (230° C./2.16 kg). In embodiments where the polymer compositions have a SSI of less than 20, it is preferable that the first copolymer satisfies only the MFRR condition. In embodiments where the polymer compositions have a SSI of about 20 to about 26, it is preferable that both of the MFR and MFRR conditions are met to achieve certain desired gel-free performance determined by rheological and visual gel tests.

Still other objects and advantages of the present disclosure will become readily apparent by those skilled in the art from the following detailed description, wherein it is shown and described only in the preferred embodiments, simply by way of illustration of the best mode. As will be realized, the disclosure is capable of other and different embodiments, and its several details are capable of modifications in various obvious respects, without departing from the disclosure. Accordingly, the description is to be regarded as illustrative in nature and not as restrictive.

DETAILED DESCRIPTION OF THE INVENTION

Processes of the invention are directed towards making polymer compositions comprising a first ethylene-α-olefin copolymer and second ethylene-α-olefin copolymer whereby such compositions preferably are useful as viscosity modifiers in lubricating oil compositions with little to no gelling. The invention provides such a process by adjusting (e.g., reducing) the concentrations of the hydrogen feed(s) in the first and/or second polymerization reaction zones, preferably such that (a) the hydrogen feed concentration in the first polymerization reaction zone is 0.0-1.0 wt %, based on total weight of feed(s) of hydrogen, ethylene monomer, α-olefin comonomer, and solvent into the first polymerization reaction zone, and/or (b) the hydrogen feed concentration in the second polymerization reaction zone is 0.0-0.5 wt %, based on total weight of feed(s) of hydrogen, ethylene monomer, α-olefin comonomer, and solvent into the second polymerization reaction zone.

In one embodiment, a process for making a polymer composition comprises the steps of:

(a) feeding (i) a first ethylene monomer, (ii) a first α-olefin comonomer, (iii) a first solvent, (iv) optionally a first hydrogen, and (v) a first metallocene catalyst, in a first polymerization reaction zone to produce a first ethylene-α-olefin copolymer;

(b) feeding (i) a second ethylene monomer, (ii) a second α-olefin comonomer, (iii) a second solvent, (iv) optionally a second hydrogen, and (v) a second metallocene catalyst, in a second polymerization reaction zone to produce a second ethylene-α-olefin copolymer; and (c) combining the first ethylene-α-olefin copolymer and the second ethylene-α-olefin copolymer to form a polymer composition, wherein the first ethylene-α-olefin copolymer has an ethylene content from about 60 to about 80 wt %, and the second ethylene-α-olefin copolymer has an ethylene content of less than about 60 wt %, and wherein the process meets at least one of the following:

(1) the first hydrogen is fed in step (a) at a first hydrogen feed concentration of 0.0-1.0 wt %, by total weight of (a)(i)-(iv) fed in step (a); and (2) the second hydrogen is fed in step (b) at a second hydrogen feed concentration of 0.0-0.5° wt %, by total weight of (b)(i)-(iv) fed in step (b).

Preferably, polymer compositions prepared according to the invention comprise polymer components including crystallinity disperse ethylene-based copolymers that are useful in modifying the rheological properties of lubrication fluids. The crystallinity disperse polymer compositions are formed from at least two ethylene-α-olefin copolymers. The crystallinity disperse polymer compositions are formed from preferably at least two ethylene-α-olefin copolymers, wherein the discrete values of residual crystallinity of each copolymer differ from each other.

Preferably, polymer compositions prepared by the processes of the present disclosure comprise (a) a first ethylene-α-olefin copolymer and (b) a second ethylene-α-olefin copolymer. The first ethylene-α-olefin copolymer (a) has an ethylene content from about 60 to about 80 wt % and can be referred to herein as a "semi-crystalline" ethylene-α-olefin copolymer. More typically, the ethylene content of first ethylene-α-olefin copolymer is from about 63 to about 77 wt %, and even more typically, the ethylene content of first ethylene-α-olefin copolymer is from about 65 to about 75 wt %. The second ethylene-α-olefin copolymer (b) has an ethylene content of less than about 60 wt %, more typically less than about 55 wt % and even more typically about 42 to about 54 wt % and is a lower crystalline ethylene-α-olefin copolymer than is the first ethylene-α-olefin copolymer (a) and can be referred to herein as an "amorphous" ethylene-α-olefin copolymer. The first ethylene-α-olefin copolymer (a) has a Melt Flow Rate Ratio (MFRR), defined as the ratio of the MFR measured at 230° C./21.6 kg and at 230° C./2.16 kg, of >30, and more typically up to about 55, even more typically about 33 to about 45, preferably >34, and more preferably about 34 to about 45, and more preferably about 35 to about 43. The first ethylene-α-olefin copolymer (a), when the MFR condition is also observed, has a MFR that is at least about 1.5 g/10 min., in another embodiment the MFR is at least about 1.6 g/10 min. A more typical range of the MFR is about 1.5 g/10 min. to about 6.5 g/10 min., and an even more typical range is about 2.5 g/10 min. to about 5.5 g/10 min. The MFR is measured by ASTM D1238 condition L (230° C./2.16 kg). In one embodiment, the first ethylene-α-olefin copolymer (a) has a MFRR>30 and a MFR of at least about 1.5 g/10 min. More preferably, the first ethylene-α-olefin copolymer (a) has a MFRR>34 and a MFR of at least about 1.6 g/10 min.

In one embodiment, the polymer compositions typically contain about 30 wt % to about 70 wt % of the first ethylene-α-olefin copolymer (a) and about 70 wt % to about 30 wt % of the second ethylene-α-olefin copolymer (b) based upon the total amount of (a) and (b) in the composition. In another embodiment, the polymer compositions typically contain about 40 wt % to about 60 wt % of the first ethylene-α-olefin copolymer (a) and about 60 wt % to about 40 wt % of the second ethylene-α-olefin copolymer (b) based upon the total amount of (a) and (b) in the composition. In a particular embodiment, the polymer composition contains about 50 to about 54 wt % of the first ethylene-α-olefin copolymer (a) and about 46 to about 50 wt % of the second ethylene-α-olefin copolymer (b) based upon the total amount of (a) and (b) in the composition.

The weight average molecular weight of the first ethylene-α-olefin copolymer in one embodiment is typically about 60,000 g/mol to about 120,000 g/mol. In another embodiment, the weight average molecular weight of the first ethylene-α-olefin copolymer is typically about 70,000 g/mol to about 110,000 g/mol. The weight average molecular weight of the second ethylene-α-olefin copolymer in one embodiment is typically about 60,000 g/mol to about 120,000 g/mol. In another embodiment, the weight average molecular weight of the second ethylene-α-olefin copolymer is typically about 70,000 g/mol to about 110,000 g/mol. The weight average molecular weight of the composition of the first ethylene-α-olefin copolymer and second ethylene-α-olefin copolymer in one embodiment is typically about 60,000 g/mol to about 120,000 g/mol. In another embodiment, the weight average molecular weight of the composition of the first ethylene-α-olefin copolymer and second ethylene-α-olefin copolymer is typically about 70,000 g/mol to about 110,000 g/mol. In a still further embodiment, the weight average molecular weight of the composition of the first ethylene-α-olefin copolymer and second ethylene-α-olefin copolymer is typically about 80,000 to about 100,000 g/mol. The molecular weight distribution of each of the ethylene-α-olefin copolymers is typically less than about 2.5, and more typically about 2.1 to about 2.4. The polymer distribution as determined by GPC is typically unimodal.

In one embodiment, the polymer compositions comprising the first ethylene-α-olefin copolymer and second ethylene-α-olefin copolymer typically have a total ethylene content of about 50 wt % to about 70 wt %. In another embodiment, the polymer compositions typically have a total ethylene content of about 55 wt % to about 65 wt %. In a particular embodiment, the polymer composition has a total ethylene content of about 57 wt % to about 63 wt %.

In one embodiment, the polymer compositions comprising the first ethylene-α-olefin copolymer and second ethylene-α-olefin copolymer typically have a Melt Flow Rate Ratio (MFRR), defined as the ratio of the MFR measured at 230° C./21.6 kg and at 230° C./2.16 kg, of >30. In a particular embodiment, the polymer composition has a MFRR of 32 to 38, and preferably from 33 to 37. In another embodiment, the polymer compositions typically have a MFRR of >34, and more typically >34 up to 38.

In one embodiment, the polymer compositions comprising the first ethylene-α-olefin copolymer and second ethylene-α-olefin copolymer typically have a MFR, measured by ASTM D 1238 condition L (230° C./2.16 kg), of ≥2.0 g/10 min. In a particular embodiment, the polymer composition has a MFR of ≥3.0.

In one embodiment, the polymer compositions comprising the first ethylene-α-olefin copolymer and second ethylene-α-olefin copolymer typically have a yield stress (YS), measured at 0° C., of ≤30 mPa. In another embodiment, the polymer compositions typically have a YS, measured at 0° C., of ≤20 mPa. In a particular embodiment, the polymer composition has a YS, measured at 0° C., of ≤10 mPa.

In one embodiment, the polymer compositions comprising the first ethylene-α-olefin copolymer and second ethylene-α-olefin copolymer typically have a YS, measured at −15° C., of ≤30 mPa. In another embodiment, the polymer compositions typically have a YS, measured at −15° C., of ≤20 mPa. In a particular embodiment, the polymer composition has a YS, measured at −15° C., of ≤10 mPa.

In one embodiment, the polymer compositions comprising the first ethylene-α-olefin copolymer and second ethylene-α-olefin copolymer typically have a tan δ of >1.5. In another embodiment, the polymer compositions typically have a tan δ of ≥2.0. In another embodiment, the polymer compositions typically have a tan δ of ≥2.5. In a particular embodiment, the polymer composition has a tan δ of ≥3.0.

The performance of ethylene-based rheology modifiers as viscosity index (VI) improvers is measured by the thickening efficiency (TE) and the shear stability index (SSI), particularly by the ratio of TE to SSI. The TE of high ethylene or semi-crystalline ethylene-propylene copolymers is typically greater than 1.80 at 24 SSI, more typically greater than 1.85 at 24 SSI, most typically greater than 1.90 at 24 SSI as measured in 1.5 wt % polymer content Group I base oil solutions having kinematic viscosity of 6.06 cSt at 100° C. The TE of the low ethylene or amorphous ethylene-propylene copolymer is typically about 1.75 at 24 SSI. It is generally believed that the composition of an olefin copolymer at a given SSI largely determines the TE, and that higher ethylene content is preferred because of its higher TE. It is believed that while increasing the ethylene content of rheology modifiers leads to improved TE/SSI ratios, it also leads to increasing crystallinity of the olefin copolymer. Increasing crystallinity, however, is thought to detract from the performance of a rheology modifier as a VI improver because crystalline polymers tend to associate. These associations are apparent as regions (e.g., "lumps") of high viscosity which give the oil a non-uniform appearance.

Definitions

For purposes of this disclosure and the claims herein, the definitions set forth below are used.

As used herein, the term "copolymer" includes any polymer having two or more monomers.

As used herein, the term "crystallinity disperse" means in reference to a polymer composition that is obtained from at least two ethylene-α-olefin copolymers, wherein at least two of the copolymers have a residual crystallinity value that differ from each other. As used herein, an "ethylene-based" copolymer, such as the second ethylene-based copolymer, is not required have a minimum ethylene content (e.g., at least 50 wt. %), unless expressly stated otherwise herein.

As used herein, the term "EA" or "Wt % $C_2$ (a)" means the weight percent of ethylene-derived units in the first ethylene-based copolymer based on the weight of the first ethylene-based copolymer.

As used herein, the term "EB" or "Wt % $C_2$ (b)" means the weight percent of ethylene-derived units in the second ethylene-based copolymer based on the weight of the second ethylene-based copolymer.

As used herein, the term "MnA" means the number-average molecular weight of the first ethylene-based copolymer, as measured by GPC.

As used herein, the term "MnB" means the number-average molecular weight of the second ethylene-based copolymer, as measured by GPC.

As used herein, the term "MwA" means the weight-average molecular weight of the first ethylene-based copolymer in units of grams/mole in terms of polystyrene, as measured by GPC.

As used herein, the term "MwB" means the weight-average molecular weight of the second ethylene-based copolymer in units of grams/mole in terms of polystyrene, as measured by GPC.

As used herein, the term "MWD" means the molecular weight distribution, or ratio of weight-average molecular weight (Mw) to number-average molecular weight (Mn).

As used herein, the terms "first" and "second" in reference to a component (e.g., a "first hydrogen" or a "second hydrogen") are intended solely as identifiers, and are not intended to suggest or require that the components be different (unless expressly provided otherwise).

For purposes of this specification and the claims appended thereto, when a polymer or copolymer is referred to as comprising an α-olefin, including, but not limited to ethylene, propylene, and butene, the olefin present in such polymer or copolymer is the polymerized form of the olefin. For example, when a copolymer is said to have an "ethylene" content of 60-80 wt %, it is understood that the mer unit in the copolymer is derived from ethylene in the polymerization reaction and said derived units are present at 60-80 wt %, based upon the weight of the copolymer.

Polymeric Compositions

In embodiments of the disclosure, the rheology modifiers for lubrication fluids described herein comprise crystallinity disperse polymer compositions. These polymer compositions comprise a first ethylene-α-olefin copolymer and a second ethylene-α-olefin copolymer.

The first ethylene-α-olefin copolymer, having a relatively higher ethylene content, as discussed herein above, is a copolymer of ethylene and an alpha-olefin comonomer.

The second ethylene-α-olefin copolymer, having a relatively lower ethylene content, as discussed herein above, is a copolymer of ethylene and an alpha-olefin.

The first and second ethylene-α-olefin copolymers each comprise ethylene and one or more α-olefin comonomers. The α-olefin comonomers are selected from the group consisting of $C_3$ to $C_{20}$ alpha-olefins and mixtures thereof. Preferably, the comonomer in each copolymer is propylene, butene, hexene, octene or mixtures thereof.

Comonomer Components

Suitable comonomers include, but are not limited to, propylene ($C_3$) and other alpha-olefins, such as $C_4$ to $C_{20}$ alpha-olefins (also referred to herein as "α-olefins"), and preferably propylene and $C_4$ to $C_{12}$ α-olefins. The α-olefin comonomer can be linear or branched, and two or more comonomers can be used, if desired. Thus, reference herein to "an alpha-olefin comonomer" includes one, two, or more alpha-olefin comonomers.

Examples of suitable comonomers include propylene, linear $C_4$ to $C_{12}$ α-olefins, and α-olefins having one or more $C_1$ to $C_3$ alkyl branches. Specific examples include: propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include: propylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene with methyl substituents on any of $C_3$ to $C_5$, 1-pentene with two methyl substituents in any stoichiometrically acceptable combination on $C_3$ or $C_4$, 3-ethyl-1-pentene, 1-octene, 1-pentene with methyl substituents on any of $C_3$ or $C_4$, 1-hexene with two methyl substituents in any stoichiometrically acceptable combination on $C_3$ to $C_5$, 1-pentene with three methyl substituents in any stoichiometrically acceptable combination on $C_3$ or $C_4$, 1-hexene with an ethyl substituent of $C_3$ or $C_4$, 1-pentene with an ethyl substituent of $C_3$ and a methyl substituent in a stoichiometrically acceptable position of $C_3$ or $C_4$, 1-decene, 1-nonene, 1-nonene with a methyl substituent on any of $C_3$ to $C_9$, 1-octene with two methyl substituents in any stoichiometrically acceptable combination of $C_3$ to $C_7$, 1-heptene with three methyl substituents in any stoichiometrically acceptable combination of $C_3$ to $C_6$, 1-octene with an ethyl substituent on any of $C_3$ to $C_7$, 1-hexene with two ethyl substituents in any stoichiometrically acceptable combination of $C_3$ or $C_4$, and 1-dodecene.

Catalyst

The terms "metallocene" and "metallocene catalyst precursor," as used herein, refer to compounds possessing a transition metal M, with cyclopentadienyl (Cp) ligands, at least one non-cyclopentadienyl-derived ligand X (e.g., a leaving group), and zero or one heteroatom-containing ligand Y, as shown in the formula under type (2), the ligands being coordinated to M and corresponding in number to the valence thereof. The metallocene catalyst precursors are generally neutral complexes but when activated with a suitable co-catalyst yield an active metallocene catalyst, which refers generally to an organometallic complex with a vacant coordination site that can coordinate, insert, and polymerize olefins. The metallocene catalyst precursor is preferably one of, or a mixture of metallocene compounds, of either or both of the following types:

(1) cyclopentadienyl (Cp) complexes that have two Cp ring systems for ligands. The Cp ligands form a sandwich complex with the metal and can be free to rotate (unbridged) or locked into a rigid configuration through a bridging group. The Cp ring ligands can be like or unlike unsubstituted, substituted, or a derivative thereof, such as a heterocyclic ring system, which may be substituted, and the substitutions can be fused to form other saturated or unsaturated rings systems, such as tetrahydroindenyl, indenyl, or fluorenyl ring systems. These cyclopentadienyl complexes have the general formula:

$(Cp^1R^1{}_m)R^3{}_n(Cp^2R^2{}_p)MX_q$

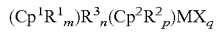

where $Cp^1$ of ligand $(Cp^1R^1{}_m)$ and $Cp^2$ of ligand $(Cp^2R^2{}_p)$ are the same or different cyclopentadienyl rings; $R^1$ and $R^2$ each is, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; and two $R^1$ and/or $R^2$ substituents on adjacent carbon atoms of the cyclopentadienyl ring associated there with can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; q is equal to the valence of M minus 2; and (2) monocyclopentadienyl complexes that have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof, such as a heterocyclic ring system which may be substituted, and the substitutions can be fused to form other saturated or unsaturated ring systems, such as tetrahydroindenyl, indenyl, or fluorenyl ring systems. The heteroatom containing ligand is bound to both the metal and optionally to the Cp ligand through the bridging group. The heteroatom itself is an atom with a coordination number of three from group VA or VIA of the periodic table of the elements. These mono-cyclopentadienyl complexes have the general formula:

$$(Cp^1R^1_m)R^3_n(YR_y^2)MX_s$$

wherein $R^1$ is, each independently, a halogen or a hydrocarbyl, halocarbyl, hydrocarbyl-substituted organometalloid or halocarbyl-substituted organometalloid group containing up to about 20 carbon atoms; m is 0 to 5; and two $R^1$ substituents on adjacent carbon atoms of the cyclopentadienyl ring associated therewith can be joined together to form a ring containing from 4 to about 20 carbon atoms; $R^3$ is a bridging group; n is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group VA or a coordination number of two from group VIA preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, where one or more hydrogen atoms is replaced with a halogen atom, and when Y is three coordinate and unbridged there may be two R groups on Y each independently a radical selected from a group consisting of $C_1$ to $C_{20}$ hydrocarbon radicals, substituted $C_1$ to $C_{20}$ hydrocarbon radicals, where one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; s is equal to the valence of M minus 2; and y is 1 if Y is a heteroatom containing group in which the heteroatom is an element with a coordination number of three from Group VA, and y is 0 if Y is a heteroatom containing group in which the heteroatom is an element with a coordination number of two from group VIA.

Examples of suitable biscyclopentadienyl metallocenes of the type described in group 1 above can be as discussed and described in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, which are incorporated by reference herein.

Illustrative, but not limiting, examples of preferred biscyclopentadienyl metallocenes of the type described in group 1 are the racemic isomers of:
  $\mu$-$(CH_3)_2Si(indenyl)_2M(Cl)_2$;
  $\mu$-$(CH_3)_2Si(indenyl)_2M(CH_3)_2$;
  $\mu$-$(CH_3)_2Si(tetrahydroindenyl)_2M(Cl)_2$;
  $\mu$-$(CH_3)_2Si(tetrahydroindenyl)_2M(CH_3)_2$;
  $\mu$-$(CH_3)_2Si(indenyl)_2M(CH_2CH_3)_2$; and
  $\mu$-$(C_6H_5)_2C(indenyl)_2M(CH_3)_2$;
wherein M is chosen from a group consisting of Zr and Hf.

Examples of suitable unsymmetrical cyclopentadienyl metallocenes of the type described in group 1 are disclosed in U.S. Pat. Nos. 4,892,851; 5,334,677; 5,416,228; and 5,449,651; and are described in publication J. Am. Chem. Soc. 1988, 110, 6255, all of which are incorporated by reference herein for purposes of U.S. patent practice.

Illustrative, but not limiting, examples of preferred unsymmetrical cyclopentadienyl metallocenes of the type described in group 1, where X=R, are:
  $\mu$-$(C_6H_5)_2C(cyclopentadienyl)(fluorenyl)M(R)_2$;
  $\mu$-$(C_6F_5)_2C(3$-methylcyclopentadienyl)(fluorenyl)$M(R)_2$;
  $\mu$-$(C_6H_5)_2C(cyclopentadienyl)(fluorenyl)M(R)_2$;
  $\mu$-$(C_6H_5)_2C(cyclopentadienyl)(2$-methylindenyl)$M(R)_2$ where R preferably is $CH_3$;
  $\mu$-$(C_6H_5)_2C(3$-methylcyclopentadienyl)(2-methylindenyl)$M(R)_2$ where R preferably is Cl;
  $\mu$—$(C_6H_5)_2C(cyclopentadienyl)(2,7$-dimethylfluorenyl)$M(R)_2$; and
  $\mu$-$(CH_3)_2C(cyclopentadienyl)(2,7$-dimethylfluorenyl)$M(R)_2$;
wherein M is chosen form a group consisting of Zr and Hf, and R is chosen from a group consisting of Cl and $CH_3$. Preferably, the metallocene catalyst is $\mu$-(di-(p-triethylsilylphenyl)methane)(cyclopentadienyl)(2,7-di-t-butylfluorenyl)hafnium dimethyl.

Examples of suitable monocyclopentadienyl metallocenes of the type described in group 2 above disclosed in U.S. Pat. Nos. 5,026,798; 5,057,475; 5,350,723; 5,264,405; 5,055,438 and are described in publication WO 96/002244, all of which are incorporated by reference herein for purposes of U.S. patent practice.

Illustrative, but not limiting, examples of preferred monocyclopentadienyl metallocenes of the type described in group 2, where X=R, are:
  $\mu$-$(CH_3)_2Si(cyclopentadienyl)(1$-adamantylamido)$M(R)_2$;
  $\mu$-$(CH_3)_2Si(3$-tertbutylcyclopentadienyl)(1-adamantylamido)$M(R)_2$;
  $\mu$-$(CH_2(tetramethylcyclopentadienyl)(1$-adamantylamido)$M(R)_2$;
  $\mu$-$(CH_3)_2Si(tetramethylcyclopentadienyl)(1$-adamantylamido)$M(R)_2$;
  $\mu$-$(CH_3)_2C(tetramethylcyclopentadienyl)(1$-adamantylamido)$M(R)_2$;
  $\mu$-$(CH_3)_2Si(tetramethylcyclopentadienyl)(1$-tertbutylamido)$M(R)_2$;
  $\mu$-$(CH_3)_2Si(fluorenyl)(1$-tertbutylamido)$M(R)_2$;
  $\mu$-$(CH_3)_2Si(tetramethylcyclopentadienyl)(1$-cyclododecylamido)$M(R)_2$; and
  $\mu$-$(C_6H_5)_2C(tetramethylcyclopentadienyl)(1$-cyclododecylamido)$M(R)_2$;
wherein M is selected from a group consisting of Ti, Zr, and Hf and wherein R is selected from Cl and $CH_3$.

The first and second metallocene catalyst can be the same or different. In some embodiments, at least one of the first and second metallocene catalyst comprises a transition metal compound that is a bridged bisindenyl metallocene having a formula

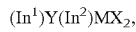
$(In^1)Y(In^2)MX_2$, where $In^1$ and $In^2$ are substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal.

In some preferred embodiments (where X=R), at least one of the first and second metallocene catalyst comprises at least one of μ-$(C_6H_5)_2$C(cyclopentadienyl)(fluorenyl)M$(R)_2$, μ-$(C_6H_5)_2$C(3-methylcyclopentadienyl)(fluorenyl)M$(R)_2$, μ-$(CH_3)_2$C(cyclopentadienyl)(fluorenyl)M$(R)_2$, μ-$(C_6H_5)_2$C(cyclopentadienyl)(2-methylindenyl)M$(CH_3)_2$, μ-$(C_6H_5)_2$C(3-methylcyclopentadienyl)(2-methylindenyl)M$(Cl)_2$, μ-$(C_6H_5)_2$C(cyclopentadienyl)(2,7-dimethylfluorenyl) M$(R)_2$ and μ-$(CH_3)_2$C(cyclopentadienyl)(2,7-dimethylfluorenyl)M$(R)_2$; wherein M is chosen form a group consisting of Zr and Hf, and R is chosen from a group consisting of Cl and $CH_3$.

In some preferred embodiments, at least one of the first and second metallocene catalyst comprises at least one of μ-dimethylsilylbis(indenyl)hafniumdimethyl, μ-dimethylsilylbis(indenyl)zirconiumdimethyl, (μ-dimethylsilyl)bis(2-methyl-4-(3,'5'-di-tert-butylphenyl)indenyl)zirconiumdimethyl, (μ-dimethylsilyl)bis(2-methyl-4-(3,'5'-di-tert-butylphenyl) indenyl)hafniumdimethyl, (μ-dimethylsilyl)bis(2-methyl-4-naphthylindenyl)-zirconiumdimethyl, (μ-dimethylsilyl)bis(2-methyl-4-naphthylindenyl)hafniumdimethyl, (μ-dimethylsilyl)bis(2-methyl-4-(N-carbazyl)indenyl)zirconiumdimethyl, (μ-dimethylsilyl)-bis(2-methyl-4-(N-carbazyl)indenyl)hafniumdimethyl, dimethylsilyl bis(2-(methyl)-5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f)indenyl)hafnium dimethyl, diphenylsilyl bis(5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f) indenyl)zirconium dichloride, cyclo-propylsilyl bis(2-(methyl)-5,5,8,8-tetramethyl-5,6,7,8-tetrahydrobenz(f) indenyl)-hafnium dimethyl, and μ-(di-(p-triethylsilylphenyl) methane)(cyclopentadienyl)(2,7-di-t-butylfluorenyl) hafnium dimethyl.

Non-coordinating Anions

The term "non-coordinating anion" (NCA) means an anion that either does not coordinate to the transition metal cation or that is only weakly coordinated to the cation thereby remaining sufficiently labile to be displaced by a neutral Lewis base. "Compatible" non-coordinating anions are those that are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge in a +1 state, and yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically, the anion will have a molecular size of greater than or equal to about 4 angstroms. NCAs are preferred because of their ability to produce a target molecular weight polymer at a higher temperature than tends to be the case with other activation systems, such as alumoxane.

Descriptions of ionic catalysts for coordination polymerization using metallocene cations activated by non-coordinating anions appear in the early work in EP-A-0 277 003; EP-A-0 277 004; WO 92/00333; U.S. Pat. Nos. 5,198,401 and 5,278,119, which are incorporated by reference herein. These references disclose a preferred method of preparation where metallocenes (bisCp and monoCp) are protonated by an anionic precursor such that an alkyl/hydride group is abstracted from a transition metal to make it both cationic and charge-balanced by the non-coordinating anion. The use of ionizing ionic compounds not containing an active proton but capable of producing both the active metallocene cation and a non-coordinating anion are also known. See, e.g., EP-A-0 426 637, EP-A-0 573 403 and U.S. Pat. No. 5,387,568, which are incorporated by reference herein. Reactive cations other than Bronsted acids capable of ionizing the metallocene compounds include ferrocenium triphenylcarbonium and triethylsilylinium cations. Any metal or metalloid capable of forming a coordination complex that is resistant to degradation by water (or other Bronsted or Lewis Acids) may be used or contained in the anion of the second activator compound. Suitable metals include, but are not limited to, aluminum, gold, platinum and the like. Suitable metalloids include, but are not limited to, boron, phosphorus, silicon and the like.

An additional method for making the ionic catalysts uses ionizing anionic pre-cursors which are initially neutral Lewis acids but form the cation and anion upon ionizing reaction with the metallocene compounds, for example, tris(pentafluorophenyl) boron acts to abstract an alkyl, hydride or silyl ligand to yield a metallocene cation and stabilizing non-coordinating anion. See, e.g., EP-A-0 427 697 and EP-A-0 520 732, which are incorporated by reference herein. Ionic catalysts for addition polymerization can also be prepared by oxidation of the metal centers of transition metal compounds by anionic precursors containing metallic oxidizing groups along with the anion groups. See, e.g., EP-A-0 495 375, which is incorporated by reference herein.

In some embodiments, at least one of the first and second polymerization reaction zones further comprises an activator including, for example, N,N-dimethylanilinium-tetrakis(perfluorophenyl)borate, N,N-dimethylanilinium-tetrakis(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetrakis(perfluorophenyl)borate, triphenylcarbenium-tetrakis (perfluoronaphthyl)borate, triphenyl-carbenium-tetrakis (perfluorobiphenyl)borate, triphenylcarbenium-tetrakis(3,5-bis(trifluoro-methyl)phenyl)borate, aluminoxanes, alumoxanes, and aluminum alkyls.

Non-Ionic Activators

Where the metal ligands include halide moieties, for example, (methyl-phenyl)silylene (tetra-methyl-cyclopentadienyl)(tert-butyl-amido) zirconium dichloride, which are not capable of ionizing abstraction under standard conditions, they can be converted via known alkylation reactions with organometallic compounds, such as lithium or aluminum hydrides or alkyls, alkylalumoxanes, Grignard reagents, etc. See, e.g., EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger, its use in excess of that normally stoichiometrically required for alkylation of the metallocene will permit its addition to the reaction solvent with the metallocene compound. Normally, alumoxane would not be added with the metallocene so as to avoid premature activation, but can be added directly to the reaction vessel in the presence of the polymerizable monomers when serving as both scavenger and alkylating activator. Alumoxanes may also fulfill a scavenging function.

Known alkylalumoxanes are additionally suitable as catalyst activators, particularly for those metallocenes comprising halide ligands. The alumoxane component useful as catalyst activator typically is an oligomeric aluminum compound represented by the general formula (R—Al—O)n, which is a cyclic compound, or R(R—Al—O)nAlR$_2$, which is a linear compound. In the general alumoxane formula, R is a $C_1$ to $C_5$ alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Polymerization Process

Processes of the invention are directed towards making polymer compositions comprising a first ethylene-α-olefin copolymer and second ethylene-α-olefin copolymer whereby such compositions preferably are useful as viscosity modifiers in lubricating oil compositions with little to no gelling. The invention provides such a process by adjusting (e.g., reducing) the concentrations of the hydrogen feed(s) in the first and/or second polymerization reaction zones, preferably such that (a) the hydrogen feed concentration in the first polymerization reaction zone is 0.0-1.0 wt %, based on total weight of feed(s) of hydrogen, ethylene monomer, α-olefin comonomer, and solvent into the first polymerization reaction zone, and/or (b) the hydrogen feed concentration in the second polymerization reaction zone is 0.0-0.5 wt %, based on total weight of feed(s) of hydrogen, ethylene monomer, α-olefin comonomer, and solvent into the second polymerization reaction zone.

In one embodiment, a process for making a polymer composition comprises the steps of:

(a) feeding (i) a first ethylene monomer, (ii) a first α-olefin comonomer, (iii) a first solvent, (iv) optionally a first hydrogen, and (v) a first metallocene catalyst, in a first polymerization reaction zone to produce a first ethylene-α-olefin copolymer;

(b) feeding (i) a second ethylene monomer, (ii) a second α-olefin comonomer, (iii) a second solvent, (iv) optionally a second hydrogen, and (a) a second metallocene catalyst, in a second polymerization reaction zone to produce a second ethylene-α-olefin copolymer; and (c) combining the first ethylene-α-olefin copolymer and the second ethylene-α-olefin copolymer and to form a polymer composition, wherein the first ethylene-α-olefin copolymer has an ethylene content from about 60 to about 80 wt %, and the second ethylene-α-olefin copolymer has an ethylene content of less than about 60 wt %, and wherein the process meets at least one of the following:

(1) the first hydrogen is fed in step (a) at a first hydrogen feed concentration of 0.0-1.0 wt %, by total weight of (a)(i)-(iv) fed in step (a); and (2) the second hydrogen is fed in step (b) at a second hydrogen feed concentration of 0.0-0.5° wt %, by total weight of (b)(i)-(iv) fed in step (b).

As used herein, the "hydrogen" referenced in the terms "first hydrogen" and "second hydrogen" means hydrogen that is fed (e.g., into the first or second polymerization reaction zone) in the form of a hydrogen feed stream.

The first hydrogen feed concentration (wt. %) is based on the total weight of the fresh feeds of the hydrogen (if any), ethylene monomer, α-olefin comonomer, and solvent fed into the first polymerization reaction zone. Similarly, the second hydrogen feed concentration (wt %) is based on the total weight of the fresh feeds of the hydrogen (if any), ethylene monomer, α-olefin comonomer, and solvent fed into the second polymerization reaction zone. While a recycle stream containing any of the foregoing components can optionally be sent back to the first and/or second polymerization reaction zones, the amount(s) of the recycled component(s) is not included in the determination of the wt. % s for the first and second hydrogen feed concentrations. Thus, hydrogen feed concentrations are based on the initial feeds of the hydrogen (if any), ethylene monomer, α-olefin comonomer, and solvent, each of which may be fed individually or with another component into the polymerization zones.

In one embodiment, the first hydrogen feed concentration is less than 1.0 wt %, preferably 0.0-0.5 wt %, or 0.0-0.2 wt %, by total weight of (a)(i)-(iv) fed in step (a). The first hydrogen feed concentration can also be 0.0 wt %, i.e., no hydrogen is fed into the first polymerization zone.

In one embodiment, the second hydrogen feed concentration is less than 0.5 wt %, preferably 0.0-0.2 wt %, by total weight of (b)(i)-(iv) fed in step (b). The second hydrogen feed concentration can also be 0.0 wt %, i.e., no hydrogen is fed into the second polymerization zone.

Preferably, the first hydrogen feed concentration is 0.0-1.0 wt % by total weight of (a)(i)-(iv) fed in step (a), and the second hydrogen feed concentration is 0.0-0.5 wt % by total weight of (b)(i)-(iv) fed in step (b). Preferably, the first hydrogen feed concentration is 0.0 wt % by total weight of (a)(i)-(iv) fed in step (a), and the second hydrogen feed concentration is 0.0-0.2 wt % by total weight of (b)(i)-(iv) fed in step (b).

Each discrete ethylene-α-olefin copolymer can be polymerized in a single, well stirred tank reactor in solution. The viscosity of the solution during polymerization can be less than 10000 cPs, or less than 7000 cPs, and preferably less than 500 cPs. The reactor is preferably a liquid filled, continuous flow, stirred tank reactor providing full back mixing for random copolymer production. Solvent, monomers, and catalyst(s) are fed to the reactor. When two or more reactors are utilized, solvent, monomers, and/or catalyst(s) is fed to the first reactor or to one or more additional reactors.

Reactors may be cooled by reactor jackets or cooling coils, autorefrigeration, prechilled feeds or combinations of all three to absorb the heat of the exothermic polymerization reaction. Autorefrigerated reactor cooling requires the presence of a vapor phase in the reactor. Adiabatic reactors with prechilled feeds are preferred in which the polymerization exotherm is absorbed by permitting a temperature rise of the polymerizing liquid.

The reactor temperature may be used to control the molecular weight of the polymer fraction produced. In series operation, this may lead to a potential temperature difference between reactors, the controlling of which may be helpful for controlling polymer molecular weight. For example, in some preferred embodiments, the temperatures in the first polymerization reaction zone and the second polymerization reaction zone differ by less than 40° C., preferably differ by less than 30° C., 20° C., or 10° C., and preferably differ by less than 5° C. or 3° C.

Reactor temperature can be selected depending upon the effect of temperature on catalyst deactivation rate and polymer properties and/or extent of monomer depletion. When using more than one reactor, generally temperatures should not exceed the point at which the concentration of catalyst in the second reactor is insufficient to make the desired polymer component in the desired amount. Therefore, reaction temperature can be determined by the details of the catalyst system.

In general, a single reactor or first reactor in a series will operate at a reactor temperature from about 0° C. to about 200° C., or from about 80° C. to about 180° C., or from about 100° C. to about 150° C. Preferably, reaction temperatures are from about 100° C. to about 150° C. or from about 110° C. to about 150° C. When using one or more additional reactors, the additional reactor temperature will vary from about 40° C. to about 200° C., with about 50° C. to about 150° C. preferred, and about 100° C. to about 150° C. more preferred. Ranges from any of the recited lower limits to any of the recited upper limits are contemplated by the inventors and within the scope of the present description. In copolymerization techniques that utilize one or more bis-Cp catalysts with one or more mono-Cp catalysts, a lower reaction temperature is preferred for reactions utilizing mono-Cp catalyst when compared to the bis-Cp catalyst.

Reaction pressure is determined by the details of the catalyst system. In general a reactor, whether a single reactor or each of a series of reactors, operates at a reactor pressure of less than 2500 pounds per square inch (psi) (17.23 MPa), or less than 2200 psi (15.16 MPa) or less than 2000 psi (13.78 MPa). Preferably, reactor pressure is from about atmospheric pressure to about 2000 psi (13.78 MPa), or from about 200 psi (1.38 MPa) to about 2000 psi (13.78 MPa), or from about 300 psi (2.07 MPa) to about 1800 psi (12.40 MPa). Ranges from any of the recited lower limits to any of the recited upper limits are contemplated and within the scope of the present description.

In the case of less stable catalysts, catalyst can also be fed to a second reactor when the selected process uses reactors in series. Optimal temperatures can be achieved, particularly for series operation with progressively increasing polymerization temperature, by using bis cyclopentadienyl catalyst systems containing hafnium as the transition metal, especially those having a covalent, single atom bridge coupling the two cyclopentadienyl rings.

Particular reactor configurations and processes suitable for use in the processes described herein are described in detail in U.S. Pat. No. 6,319,998 and U.S. Provisional Patent Application having Ser. No. 60/243,192, filed Oct. 25, 2000, which are incorporated by reference herein. Branching can be introduced by the choice of polymerization catalysts or process.

In alternative embodiments, the first and second ethylene-based copolymers can be polymerized in an alkane solvent, such as hexane (or isomers of hexane) in a solution process or propylene in a slurry process and finished to remove the solvent. The first and second ethylene-based copolymers can have a medium viscosity and a molecular weight in excess of that needed in the final lubricant formulation. For example, most of the traditional ethylene-propylene-diene (EPDM) rubber manufacturing plants cannot produce low viscosity polymers having the right viscosity for lubricant formulations. In another example, low viscosity copolymers tend to cold flow upon storage. The second example can be particularly true for amorphous copolymers, which have a lower plateau modulus. The bales are then processed by a series of steps to create the final lubricant composition.

The ethylene conversion rates (%) in the first polymerization reaction zone (the "first ethylene conversion rate") and the second polymerization reaction zone (the "second ethylene conversion rate") can be the same or different. In some embodiments, the first and second ethylene conversion rates are different, and differ by at least 5%, 10%, at least 15%, or at least 20% in value (conversion rate %), with either the first or second ethylene conversion rate having the higher value. In one preferred embodiment, the first ethylene conversion rate is higher than the second ethylene conversion rate.

In some embodiments, ethylene and a first α-olefin comonomer can be polymerized in the presence of a first metallocene catalyst in a first polymerization reaction zone under first polymerization conditions to produce a first effluent comprising a first ethylene-based copolymer. Ethylene and a second α-olefin comonomer can also be polymerized in the presence of a second metallocene catalyst in a second polymerization reaction zone under second polymerization conditions to produce a second effluent comprising a second ethylene-α-olefin copolymer. The resulting discrete copolymers can then be mixed or otherwise compounded to provide the rheology modifier.

In one or more embodiments, the first and second polymerization conditions can include at least one of slurry phase, solution phase, and bulk phase. When the first and second polymerization conditions are solution phase, forming the polymer composition can further include substantial removal of the solvent from the first effluent, the second effluent, or both to produce a solid polymer composition.

In one or more embodiments, separate polymerizations can be performed in parallel with the effluent polymer solutions from three reactors combined downstream before the finishing. In another embodiment, separate polymerizations may be performed in series, where the effluent of one reactor is fed to the next reactor. In still another embodiment, the separate polymerization may be performed in the same reactor, preferably in sequential polymerizations.

The ethylene-α-olefin copolymers can be polymerized by a metallocene catalyst to form the first ethylene-based copolymer in one reactor and the second ethylene-α-olefin copolymer in another reactor. The first and second ethylene-α-olefin copolymers can be combined and then subjected to finishing steps to produce the polymer composition. The first ethylene-based copolymer can be made first; alternatively, the second ethylene-α-olefin copolymer can be made first in a series reactor configuration or the ethylene-α-olefin copolymers can be made simultaneously in a parallel reactor configuration.

The metallocene catalysts, and their use with non-coordinating ions and non-ionic activators used in the polymerization process can be as discussed and described in U.S. Provisional Patent Application having Ser. No. 61/173,528, entitled "Ethylene-Based Copolymers and Lubricating Oil Compositions Containing the Same," filed on Apr. 28, 2009, which is incorporated by reference herein.

Examples of suitable bis-cyclopentadienyl metallocenes, include, but are not limited to the type disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, which are incorporated by reference herein.

Lubrication Oil Composition

Lubricating oil compositions containing the polymer composition and one or more base oils (or basestocks) are also provided. The basestock can be or include natural or synthetic oils of lubricating viscosity, whether derived from hydrocracking, hydrogenation, other refining processes, unrefined processes, or re-refined processes. The basestock can be or include used oil. Natural oils include animal oils, vegetable oils, mineral oils and mixtures thereof. Synthetic oils include hydrocarbon oils, silicon-based oils, and liquid esters of phosphorus-containing acids. Synthetic oils may be produced by Fischer-Tropsch gas-to-liquid synthetic procedure as well as other gas-to-liquid oils.

In one embodiment, the basestock is or includes a polyalphaolefin (PAO) including a PAO-2, PAO-4, PAO-5, PAO-6, PAO-7 or PAO-8 (the numerical value relating to Kinematic Viscosity at 100° C.). Preferably, the polyalphaolefin is prepared from dodecene and/or decene. Generally, the polyalphaolefin suitable as an oil of lubricating viscosity has a viscosity less than that of a PAO-20 or PAO-30 oil. In one or more embodiments, the basestock can be defined as specified in the American Petroleum Institute (API) Base Oil Interchangeability Guidelines. For example, the basestock can be or include an API Group I, II, III, IV, V oil or mixtures thereof.

In one or more embodiments, the basestock can include oil or compositions thereof conventionally employed as crankcase lubricating oils. For example, suitable basestocks can include crankcase lubricating oils for spark-ignited and compression-ignited internal combustion engines, such as automobile and truck engines, marine and railroad diesel engines, and the like. Suitable basestocks can also include those oils conventionally employed in and/or adapted for use as power transmitting fluids, such as automatic transmission fluids, tractor fluids, universal tractor fluids and hydraulic fluids, heavy duty hydraulic fluids, power steering fluids and the like. Suitable basestocks can also be or include gear lubricants, industrial oils, pump oils and other lubricating oils.

In one or more embodiments, the basestock can include not only hydrocarbon oils derived from petroleum, but also include synthetic lubricating oils, such as esters of dibasic acids; complex esters made by esterification of monobasic acids, polyglycols, dibasic acids and alcohols; polyolefin oils, etc. Thus, the lubricating oil compositions described can be suitably incorporated into synthetic base oil basestocks, such as alkyl esters of dicarboxylic acids, polyglycols and alcohols; polyalpha-olefins; polybutenes; alkyl benzenes; organic esters of phosphoric acids; polysilicone oils; etc. The lubricating oil composition can also be utilized in a concentrate form, such as from 1 wt % to 49 wt % in oil, e.g., mineral lubricating oil, for ease of handling, and may be prepared in this form by carrying out the reaction of the invention in oil as previously described.

The lubrication oil composition can include a basestock and one or more compositionally disperse polymer compositions and/or one or more crystallinity disperse polymer compositions, and optionally, a pour point depressant. The lubrication oil composition can have a thickening efficiency greater than 1.5, or greater than 1.7, or greater than 1.9, or greater than 2.2, or greater than 2.4 or greater than 2.6. The lubrication oil composition can have a shear stability index less than 55, or less than 45, or less than 35, or less than 30, or less than 25, or less than 20, or less than 15. The lubrication oil composition can have a Mini Rotary Viscometer (MRV) viscosity of less than 60,000 cps according to ASTM D4684. The lubrication oil composition can have a pour point of less than −25 C according to ASTM 5949. The lubrication oil composition can have any combination of desired properties. For example, the lubrication oil composition can have a thickening efficiency greater than about 1.5 or greater than about 2.6, a shear stability index of less than 55 or less than 35 or less than 25 and/or a Mini Rotary Viscometer (MRV) viscosity at −35° C. in a 10W-50 formulation of less than about 60,000 cps according to ASTM D4684.

The lubrication oil composition preferably comprises about 2.5 wt %, or about 1.5 wt %, or about 1.0 wt % or about 0.5 wt % of the compositionally disperse and/or crystallinity disperse polymer composition. In some embodiments, the amount of the polymer composition in the lubrication oil composition can range from a low of about 0.5 wt %, about 1 wt %, or about 2 wt %, to a high of about 2.5 wt %.

The lubricating oil compositions of the invention can optionally contain one or more conventional additives, such as, for example, pour point depressants, antiwear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative corrosion inhibitors include phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon, such as a terpene, a heavy petroleum fraction of a $C_2$ to $C_6$ olefin polymer, such as polyisobutylene, with from 5 to 30 wt % of a sulfide of phosphorus for ½ to 15 hours, at a temperature in the range of 66° C. to 316° C. Neutralization of the phosphosulfurized hydrocarbon may be effected in the manner known by those skilled in the art.

Oxidation inhibitors, or antioxidants, reduce the tendency of mineral oils to deteriorate in service, as evidenced by the products of oxidation, such as sludge and varnish-like deposits on the metal surfaces, and by viscosity growth. Such oxidation inhibitors include alkaline earth metal salts of alkylphenolthioesters having $C_5$ to $C_{12}$ alkyl side chains, e.g., calcium nonylphenate sulfide, barium octylphenate sulfide, dioctylphenylamine, phenylalphanaphthylamine, phosphosulfurized or sulfurized hydrocarbons, etc. Other oxidation inhibitors or antioxidants useful in this invention include oil-soluble copper compounds, such as described in U.S. Pat. No. 5,068,047.

Friction modifiers serve to impart the proper friction characteristics to lubricating oil compositions, such as automatic transmission fluids. Representative examples of suitable friction modifiers are found in U.S. Pat. No. 3,933,659, which discloses fatty acid esters and amides; U.S. Pat. No. 4,176,074, which describes molybdenum complexes of polyisobutenyl succinic anhydride-amino alkanols; U.S. Pat. No. 4,105,571, which discloses glycerol esters of dimerized fatty acids; U.S. Pat. No. 3,779,928, which discloses alkane phosphonic acid salts; U.S. Pat. No. 3,778,375, which discloses reaction products of a phosphonate with an oleamide; U.S. Pat. No. 3,852,205, which discloses S-carboxyalkylene hydrocarbyl succinimide, S-carboxyalkylene hydrocarbyl succinamic acid and mixtures thereof; U.S. Pat. No. 3,879,306, which discloses N(hydroxyalkyl)alkenyl-succinamic acids or succinimides; U.S. Pat. No. 3,932,290, which discloses reaction products of di-(lower alkyl) phosphites and epoxides; and U.S. Pat. No. 4,028,258, which discloses the alkylene oxide adduct of phosphosulfurized N-(hydroxyalkyl)alkenyl succinimides. Preferred friction modifiers are succinate esters, or metal salts thereof, of hydrocarbyl substituted succinic acids or anhydrides and thiobis-alkanols, such as described in U.S. Pat. No. 4,344,853.

Dispersants maintain oil insolubles, resulting from oxidation during use, in suspension in the fluid, thus preventing sludge flocculation and precipitation or deposition on metal parts. Suitable dispersants include high molecular weight N-substituted alkenyl succinimides, the reaction product of oil-soluble polyisobutylene succinic anhydride with ethylene amines, such as tetraethylene pentamine, and borated salts thereof. High molecular weight esters (resulting from the esterification of olefin substituted succinic acids with mono or polyhydric aliphatic alcohols) or Mannich bases from high molecular weight alkylated phenols (resulting from the condensation of a high molecular weight alkylsubstituted phenol, an alkylene polyamine and an aldehyde such as formaldehyde) are also useful as dispersants.

Pour point depressants ("PPD"), otherwise known as lube oil flow improvers, lower the temperature at which the fluid will flow or can be poured. Any suitable pour point depressant known in the art can be used. For example, suitable pour point depressants include, but are not limited to, one or more $C_8$ to $C_{18}$ dialkylfumarate vinyl acetate copolymers, polymethyl methacrylates, alkylmethacrylates and wax naphthalene.

Foam control can be provided by any one or more anti-foamants. Suitable anti-foamants include polysiloxanes, such as silicone oils and polydimethyl siloxane.

Anti-wear agents reduce wear of metal parts. Representatives of conventional antiwear agents are zinc dialkyldithiophosphate and zinc diaryldithiosphate, which also serve as an antioxidant.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulfonates (especially Ca and Mg salts) are frequently used as detergents.

Compositions containing these conventional additives can be compounded with the basestock in amounts effective to provide their normal attendant function. Thus, typical formulations can include, in amounts by weight, a VI improver (from about 0.01% to about 12%); a corrosion inhibitor (from about 0.01% to about 5%); an oxidation inhibitor (from about 0.01% to about 5%); a pour point depressant (of from about 0.01% to about 5%); an anti-foaming agent (from about 0.001% to about 3%); an anti-wear agent (from about 0.001% to about 5%); a friction modifier (from about 0.01% to about 5%); a detergent/rust inhibitor (from about 0.01 to about 10%); and a base oil.

When other additives are used, it may be desirable, although not necessary, to prepare additive concentrates that include concentrated solutions or dispersions of the VI improver (in concentrated amounts), together with one or more of the other additives, such a concentrate denoted an "additive package," whereby several additives can be added simultaneously to the basestock to form a lubrication oil composition. Dissolution of the additive concentrate into the lubrication oil can be facilitated by solvents and by mixing accompanied with mild heating, but this is not essential. The additive-package can be formulated to contain the VI improver and optional additional additives in proper amounts to provide the desired concentration in the final formulation when the additive-package is combined with a predetermined amount of base oil.

Compounding With Basestock Oils

Conventional compounding methods are described in U.S. Pat. No. 4,464,493, which is incorporated by reference herein. This conventional process passes the polymer through an extruder at elevated temperature for degradation of the polymer and circulates hot oil across the die face of the extruder while reducing the degraded polymer to particle size upon issuance from the extruder and into the hot oil. The pelletized, solid polymer compositions of the present invention, as described above, can be added by compounding directly with the base oil so as to give directly the viscosity for the VI improver, so that the complex multi-step process of the prior art is not needed. The solid polymer composition can be dissolved in the basestock without the need for additional shearing and degradation processes.

The polymer compositions will be soluble at room temperature in lube oils at up to 15 percent concentration in order to prepare a viscosity modifier concentrate. Such concentrates, including eventually an additional additive package including the typical additives used in lube oil applications as described above, are generally further diluted to the final concentration (usually around 1%) by multi-grade lube oil producers. In this case, the concentrate will be a pourable homogeneous solid free solution.

The polymer compositions typically have an SSI (determined according to ASTM D6278) of from about 10 to about 60. The preferred compositions have an SSI from 20 to 30.

Specific Embodiments

Polymer Analyses

The ethylene contents as an ethylene weight percent ($C_2$ wt %) for the ethylene-based copolymers were determined according to ASTM D3900.

Visual Gelation Test

The visual gel test was carried out as disclosed in U.S. Provisional Patent Application Ser. No. 61/540,997, filed Sep. 29, 2011 and entitled, Rheological Methods To Determine The Predisposition Of A Polymer To Form Network Or Gel, disclosure of which is incorporated herein by reference. A 40 ml sample of the solution was placed into a 125 ml clear glass vial (or jar) and sealed with a cap. A typical glass vial is available from Fisher Scientific Corporation (cat #:02-912-345). The glass vial was stored at 10° C. for 8 hours in a low temperature refrigerator maintained at 10° C.+/−3° C. The glass vial was then stored at −15° C.+/−0.5° C. for 16 hours in a freezer. The above temperature conditions were repeated for multiple cycles. One cycle constituted of 8 hours of sample stored at 10° C., followed by 16 hours at −15° C. The glass vial was rated after one and four temperature cycles. A thermocouple was placed into a reference vial, identical to the sample, but containing only the solvent or base oil to monitor the actual sample temperature. The rating of sample was performed immediately after storage at 16 hours at −15° C. in the freezer. During rating, the vial was immediately poured or tilted to almost horizontal position. If condensation formed on the outside of the vial, the condensation was wiped off with a paper towel. The following visual grading was used to rate the sample visually.

| GRADE | DESCRIPTION | DETAILED COMMENTS |
|---|---|---|
| 0 | No gel | Free flowing fluid with mirror surface |
| 1 | Light gel | Slight non-homogeneity, surface roughness |
| 2 | Medium gel | Large non-homogeneity, slight pulling away from vial |
| 3 | Heavy gel | Pulls away from vial, large visible lumps |
| 4 | Solid | Solid gel |

Melt Flow Rate (MFR) was measured according to ASTM D1238 at 230° C. under a 2.16 kilogram load or a 21.6 kilogram load.

Shear Stability Index (SSI) was determined according to ASTM D6278 at 30 cycles using a Kurt Orbahn diesel injection apparatus.

The yield stress and tan (δ) measurements were carried out as disclosed in U.S. Provisional Application Ser. No. 61/540,997, filed Sep. 29, 2011 and entitled, Rheological Methods To Determine The Predisposition Of A Polymer To Form Network Or Gel, disclosure of which is incorporated herein by reference. Rheology was performed on 2.4 wt % PAO4 solutions containing the VIIs (test oil). Two methods were used to determine the low temperature performance of the VII.

Steady State Flow method: A shear rate response to varying stress from 100 Pa to 0.002 Pa was measured at constant temperature using a TA Instruments AR-1000 rheometer equipped with 60 mm 2°2'01" steel cone fixture. The yield stress was calculated by fitting viscosity-shear stress response to a Herschel-Bulkley model. In general, lower yield stress values are desired for good low temperature performance. The solutions with yield stress <20 mPa is preferred in the test oil.

Oscillatory Rheology Method: Storage Modulus (G'), Loss Modulus (G"), complex viscosity and tan δ(G'/G") is measured at an angular frequency of 1 rad/s applying 0.2 Pa oscillatory stress at 1° C./min cooling rate from temperature range of 40° C. to −18° C. It is desired that there is no gel point (G'>G") during the measurement. Also, a higher tan δ value is preferred at −15° C. for better low temperature performance of the VII. The preferred value of tan δ in VII is >3.0 in test oil.

Thickening efficiency (TE) is a measure of the thickening ability of the polymer in oil, and is defined as: TE= $2/c \times \ln((kv_{(polymer+oil)})/k_{oil})/\ln(2)$, where c is the concentration of the polymer and kv is kinematic viscosity at 100 C according to ASTM D445. The shear stability index (SSI) is an indication of the resistance of polymers to permanent mechanical shear degradation in an engine. The SSI can be determined by passing a polymer-oil solution for 30 cycles through a high shear Bosch diesel injector according to the procedures listed in ASTM D6278. The SSI of a polymer can be calculated from the viscosity of the oil without polymer and the initial and sheared viscosities of the polymer-oil solution using:

$$SSI=100 \times (kv_{(polymer+oil),fresh} - kv_{(polymer+oil),sheared})/ kv_{(polymer+oil),fresh} - kv_{oil,fresh})$$

EXAMPLES

Preparation of the Ethylene-α-Olefin Copolymers

Copolymer compositions as described above were synthesized as follows. The copolymer compositions were synthesized in two continuous stirred tank reactors connected in series. The effluent from the first reactor, containing a first copolymer component, unreacted monomers, and solvent, was fed, with additional monomers, to a second reactor where the polymerization was continued under different process conditions to produce a second copolymer component. The polymerization was performed in solution using isohexane as solvent. During the polymerization process, hydrogen addition and temperature control were used to achieve the desired melt flow rate. The catalyst, activated externally to the reactor, was added as needed in amounts effective to maintain the target polymerization temperature.

In the first reactor, the first copolymer component was produced in the presence of ethylene, propylene, and a catalyst comprising the reaction product of N,N-dimethylanilinium tetrakis(pentafluorophenyl)boron and [cyclopentadienyl(2,7-di-t-butylfluorenyl)di-p-triethylsilanephenylmethane]hafnium dimethyl.

In the second reactor, the second copolymer component was produced in the presence of ethylene, propylene, and a catalyst comprising the reaction product of N,N-dimethylanilinium tetrakis(pentafluorophenyl)boron and [cyclopentadienyl(2,7-di-t-butylfluorenyl)di-p-triethylsilanephenylmethane]hafnium dimethyl.

The mixed copolymer solution emerging from the second reactor was quenched and then devolatilized using conventionally known devolatilization methods, such as flashing or liquid phase separation, first by removing the bulk of the isohexane to provide a concentrated solution, and then by stripping the remainder of the solvent in anhydrous conditions using a devolatilizer so as to end up with a molten polymer composition containing less than 0.5 wt % of solvent and other volatiles. The molten polymer composition was advanced by a screw to a pelletizer from which the polymer composition pellets are submerged in water and cooled until solid.

Further details for processes for making ethylene-α-olefin copolymer compositions are provided below in Table A.

Comparative Example A illustrates a process where the hydrogen feed concentration for the first copolymer (amorphous) component is 0.6 wt %, and the hydrogen feed concentration for the second copolymer (semi-crystalline) component is 1.2 wt %, based on the total feeds of the ethylene monomer, α-olefin comonomer, solvent, and hydrogen.

Inventive Example 1 illustrates a process where the hydrogen feed concentration for the first copolymer (semi-crystalline) component is 0.17 wt %, and the hydrogen feed concentration for the second copolymer (amorphous) component is 0.12 wt %, based on the total feeds of the ethylene monomer, α-olefin comonomer, solvent, and hydrogen.

TABLE A

|  | Comp. Ex. A | Inventive Ex. 1 |
| --- | --- | --- |
| Total MFR | 4.2 | 4.75 |
| Semi-crystalline (SC) MFR | 2.8 | 4.2 |
| Amorphous (AM) MFR | 10.9 | 5.6 |
| Total % C2 | 65.2 | 60.6 |
| Semi-crystalline % C2 | 72 | 69.2 |
| Amorphous % C2 | 49.2 | 51.2 |
| Semi-crystalline Wt % | 70.1 | 51.8 |
| Amorphous Wt % | 29.9 | 48.2 |
| Total MFRR | 21.9 | 34 |
| Semi-crystalline MFRR | NA | 38.7 |
| 1st Reactor Component | Amorphous (AM) | Semi-crystalline (SC) |
| 2nd Reactor Component | Semi-crystalline (SC) | Amorphous (AM) |
| Reactor Temp (SC), ° C. | 140 | 132 |
| Reactor Temp (AM), ° C. | 99 | 134 |
| $C_2$ Conversion (AM), % | 80 | 69.2 |
| $C_3$ Conversion (AM), % | 83 | 43.2 |
| $C_2$ Conversion (SC), % | 75 | 91.6 |
| $C_3$ Conversion (SC), % | 54 | 69.2 |
| $C_2$ Feed Conc. (SC), Wt % | 17.1 | 7.3 |
| $C_3$ Feed Conc. (SC), Wt % | 9.6 | 3.9 |
| $C_6$ Feed Conc. (SC), Wt % | 72.1 | 88.6 |
| $H_2$ Feed Conc. (SC), Wt % | 1.2 | 0.17* |
| $C_2$ Feed Conc. (AM), Wt % | 3.1 | 7.5* |
| $C_3$ Feed Conc. (AM), Wt % | 3.2 | 12.7* |
| $C_6$ Feed Conc. (AM), Wt % | 93.1 | 79.6* |
| $H_2$ Feed Conc. (AM), Wt % | 0.6 | 0.12* |
| Gel Rating (4 cycles) | 3 | 0 |

TABLE A-continued

|  | Comp. Ex. A | Inventive Ex. 1 |
|---|---|---|
| Yield Stress @ 0° C., mPa | 50.3 | 0 |
| Yield Stress @ −15° C., mPa | 84.0 | 0 |
| Tan δ | 0.8 | 18.2 |

*R2 feed only; excludes R1 effluent.

As illustrated in Table A, Inventive Example 1, which has a lower hydrogen feed concentration in the first polymerization reaction zone (0.17 wt %, semi-crystalline component) compared to Comparative Example A (0.6 wt %, amorphous component), resulted in a gel rating of 0, whereas Comparative Example A resulted in a gel rating of 3.

In addition, Inventive Example 1, which has a lower hydrogen feed concentration in the second polymerization reaction zone (0.12 wt %, amorphous component) compared to Comparative Example A (1.2 wt %, semi-crystalline component), resulted in a gel rating of 0, whereas Comparative Example A resulted in a gel rating of 3.

In addition, Inventive Example 1, which has temperature difference between the first reactor (132° C.) and the second reactor (134° C.) of only 2° C., compared to Comparative Example A's temperature difference of 41 C (99° C. in first reactor; 140° C. in second reactor), resulted in improved gel rating.

It was also observed that Inventive Example 1, which has an ethylene conversion rate difference between the first reactor (91.6%) and the second reactor (69.2%) of 22%, compared to Comparative Example A's ethylene conversion rate difference of 5% (80% in the first reactor, 75% in the second reactor), resulted in improved gel rating.

Another difference, as shown in Table A, is that Comparative Example A makes the amorphous component in the first polymerization zone, and the semi-crystalline component in the second polymerization zone. Inventive Example 1, on the other hand, makes the semi-crystalline component in the first polymerization zone, and the amorphous component in the second polymerization zone.

Exemplary embodiments of the present disclosure include:

Embodiment 1: A process for making a polymer composition comprising the steps of:

(a) feeding (i) a first ethylene monomer, (ii) a first α-olefin comonomer, (iii) a first solvent, (iv) optionally a first hydrogen, and (v) a first metallocene catalyst, in a first polymerization reaction zone to produce a first ethylene-α-olefin copolymer;

(b) feeding (ii) a second ethylene monomer, (ii) a second α-olefin comonomer, (iii) a second solvent, (iv) optionally a second hydrogen, and (a) second metallocene catalyst, in a second polymerization reaction zone to produce a second ethylene-α-olefin copolymer; and (c) combining the first ethylene-α-olefin copolymer and the second ethylene-α-olefin copolymer to form a polymer composition, wherein the first ethylene-α-olefin copolymer has an ethylene content from about 60 to about 80 wt %, and the second ethylene-α-olefin copolymer has an ethylene content of less than about 60 wt %, and wherein the process meets at least one of the following:

(1) the first hydrogen is fed in step (a) at a first hydrogen feed concentration of 0.0-1.0 wt %, by total weight of (a)(i)-(iv) fed in step (a); and (2) the second hydrogen is fed in step (b) at a second hydrogen feed concentration of 0.0-0.5 wt %, by total weight of (b)(i)-(iv) fed in step (b), preferably where the polymer composition comprises:

(a) a first ethylene-α-olefin copolymer and (b) a second ethylene-α-olefin copolymer, wherein (c) the first ethylene-α-olefin copolymer (a) has an ethylene content from about 60 to about 80 wt %;

(d) the second ethylene-α-olefin copolymer (b) has an ethylene content of less than about 60 wt %; and (e) the first ethylene-α-olefin copolymer (a) has a Melt Flow Rate Ratio (MFRR), defined as the ratio of the MFR measured at 230° C./21.6 kg and at 230° C./2.16 kg, of greater than 30 and optionally has a Melt Flow Rate (MFR) of at least about 1.5 g/10 min measured by ASTM D 1238 condition L (230° C./2.16 kg). Preferably, the process of Embodiment 1 makes the polymer composition of any of Embodiments A-JJ. Preferably, the temperature in the first polymerization reaction zone and the temperature in the second polymerization reaction zone differ by less than 40° C., and preferably less than 20° C. Preferably, the ethylene conversion rate % in the first polymerization reaction zone and the ethylene conversion rate % in the second polymerization reaction zone differ by at least 5%, and preferably at least 10%.

Embodiment 2: The process of Embodiment 1, wherein the first hydrogen feed concentration is 0.0-1.0 wt %, and the second hydrogen feed concentration is 0.0-0.5 wt % by total weight of (a)(i)-(iv) fed in step (a).

Embodiment 3: The process of any of Embodiments 1 through 2, wherein the first hydrogen feed concentration is 0.0-0.5 wt % by total weight of (a)(i)-(iv) fed in step (a).

Embodiment 4: The process of any of Embodiments 1 through 3, wherein at least one of the first and second hydrogen feed concentrations is 0.0-0.2 wt % (by total weight of (a)(i)-(iv) fed in step (a) for the first hydrogen feed concentration, and by total weight of (b)(i)-(iv) fed in step (b) for the second hydrogen feed concentration).

Embodiment 5: The process of any of Embodiments 1 through 4, wherein the first hydrogen feed concentrations is 0.0 wt % by total weight of (a)(i)-(iv) fed in step (a).

Embodiment 6: The process of any of Embodiments 1 through 5, wherein the first hydrogen feed concentration is 0.0 wt % by total weight of (a)(i)-(iv) fed in step (a), and the second hydrogen feed concentration is 0.0-0.2 wt % by total weight of (b)(i)-(iv) fed in step (b).

Embodiment 7: The process of any of Embodiments 1 through 6, wherein at least one of the first and second solvents comprises hexane or isomers of hexane.

Embodiment 8: The process of any of Embodiments 1 through 7, wherein at least one of the first and second metallocene catalyst comprises a transition metal compound having a formula:

$(Cp^1R^1_m)R^3_n(Cp^2R^2_p)MX_q$ where $Cp^1$ of ligand $(Cp^1R^1_m)$ and $Cp^2$ of ligand $(Cp^2R^2_p)$ are the same or different cyclopentadienyl rings; $R^1$ and $R^2$ each is, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; and two $R^1$ and/or $R^2$ substituents on adjacent carbon atoms of the cyclopentadienyl ring associated there with can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; q is equal to the valence of M minus 2; or

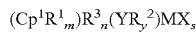

wherein $R^1$ is, each independently, a halogen or a hydrocarbyl, halocarbyl, hydrocarbyl-substituted organometalloid or halocarbyl-substituted organometalloid group containing up to about 20 carbon atoms; m is 0 to 5; and two $R^1$ substituents on adjacent carbon atoms of the cyclopentadienyl ring associated therewith can be joined together to form a ring containing from 4 to about 20 carbon atoms; $R^3$ is a bridging group; n is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group VA or a coordination number of two from group VIA preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, where one or more hydrogen atoms is replaced with a halogen atom, and when Y is three coordinate and unbridged there may be two R groups on Y each independently a radical selected from a group consisting of $C_1$ to $C_{20}$ hydrocarbon radicals, substituted $C_1$ to $C_{20}$ hydrocarbon radicals, where one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; s is equal to the valence of M minus 2; and y is 1 if Y is a heteroatom containing group in which the heteroatom is an element with a coordination number of three from Group VA, and y is 0 if Y is a heteroatom containing group in which the heteroatom is an element with a coordination number of two from group VIA.

Embodiment 9: The process of any of Embodiments 1 through 8, wherein X=R, and at least one of the first and second metallocene catalyst comprises a transition metal compound that is at least one of μ-$(C_6H_5)_2$C(cyclopentadienyl)(fluorenyl)M(R)$_2$, μ-$(C_6H_5)_2$C(3-methylcyclopentadienyl)(fluorenyl)M(R)$_2$, μ-$(CH_3)_2$C(cyclopentadienyl)(fluorenyl)M(R)$_2$, μ-$(C_6H_5)_2$C(cyclopentadienyl)(2-methylindenyl)M(R)$_2$, μ-$(C_6H_5)_2$C(3-methylcyclopentadienyl)(2-methylindenyl)M(R)$_2$, μ-$(C_6H_5)_2$C(cyclopentadienyl)(2,7-dimethylfluorenyl)M(R)$_2$ and μ-$(CH_3)_2$C(cyclopentadienyl)(2,7-dimethylfluorenyl)M(R)$_2$; wherein M is chosen form a group consisting of Zr and Hf, and R is chosen from a group consisting of Cl and $CH_3$.

Embodiment 10: The process of any of Embodiments 1 through 9, wherein the at least one of the first and second metallocene catalyst comprises a transition metal compound that is at least one of μ-dimethylsilylbis(indenyl)hafniumdimethyl, μ-dimethylsilylbis(indenyl)zirconiumdimethyl, (μ-dimethylsilyl)bis(2-methyl-4-(3,'5'-di-tert-butylphenyl)indenyl)zirconiumdimethyl, (μ-dimethylsilyl)bis(2-methyl-4-(3,'5'-di-tert-butylphenyl)indenyl)hafniumdimethyl, (μ-dimethylsilyl)bis(2-methyl-4-naphthylindenyl)-zirconiumdimethyl, (μ-dimethylsilyl)bis(2-methyl-4-naphthylindenyl)hafniumdimethyl, (-dimethylsilyl)bis(2-methyl-4-(N-carbazyl)indenyl)zirconiumdimethyl, (μ-dimethylsilyl)-bis(2-methyl-4-(N-carbazyl)indenyl)hafniumdimethyl, dimethylsilyl bis(2-(methyl)-5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)zirconium dichloride, cyclopropylsilyl bis(2-(methyl)-5,5,8,8-tetramethyl-5,6,7,8-tetrahydrobenz(f)indenyl)-hafnium dimethyl, and μ-(di-(p-triethylsilylphenyl)methane)(cyclopentadienyl)(2,7-di-t-butylfluorenyl)hafnium dimethyl.

Embodiment 11: The process of any of Embodiments 1 through 10, wherein at least one of the first and second polymerization reaction zones further comprises an activator that is at least one of N,N-dimethylanilinium-tetrakis(perfluorophenyl)borate, N,N-dimethylanilinium-tetrakis(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetrakis(perfluorophenyl)borate, triphenylcarbenium-tetrakis(perfluoronaphthyl)borate, triphenyl-carbenium-tetrakis(perfluorobiphenyl)borate, triphenylcarbenium-tetrakis(3,5-bis(trifluoro-methyl)phenyl)borate, aluminoxanes, alumoxanes, and aluminum alkyls.

Embodiment 12: The process of any of Embodiments 1 through 11, wherein X=R, and the first and second metallocene catalysts comprise a transition metal compound that is at least one of μ-$(C_6H_5)_2$C(cyclopentadienyl)(fluorenyl)M(R)$_2$, μ-$(C_6H_5)_2$C(3-methylcyclopentadienyl)(fluorenyl)M(R)$_2$, μ-$(CH_3)_2$C(cyclopentadienyl)(fluorenyl)M(R)$_2$, μ-$(C_6H_5)_2$C(cyclopentadienyl)(2-methylindenyl)M(R)$_2$, μ-$(C_6H_5)_2$C(3-methylcyclopentadienyl)(2-methylindenyl)M(R)$_2$; μ-$(C_6H_5)_2$C(cyclopentadienyl)(2,7-dimethylfluorenyl)M(R)$_2$ and μ-$(CH_3)_2$C(cyclopentadienyl)(2,7-dimethylfluorenyl)M(R)$_2$; wherein M is chosen form a group consisting of Zr and Hf, and R is chosen from a group consisting of Cl and $CH_3$.

Embodiment 13: The process of any of Embodiments 1 through 12, wherein the first and second polymerization reaction zones further comprise an activator that is at least one of N,N-dimethylanilinium-tetrakis(perfluorophenyl)borate, N,N-dimethylanilinium-tetrakis(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetrakis(perfluorophenyl)borate, triphenylcarbenium-tetrakis(perfluoronaphthyl)borate, triphenyl-carbenium-tetrakis(perfluorobiphenyl)borate, triphenylcarbenium-tetrakis(3,5-bis(trifluoro-methyl)phenyl)borate, aluminoxanes, alumoxanes, and aluminum alkyls.

Embodiment 14: The process of any of Embodiments 1 through 13, wherein the first and second polymerization conditions are in slurry phase, solution phase or bulk phase.

Embodiment 15: The process of any of Embodiments 1 through 14, wherein the first and second polymerization reaction zones are in series.

Embodiment 16: The process of any of Embodiments 1 through 15, wherein the first ethylene-α-olefin copolymer has a Melt Flow Rate Ratio (MFRR), defined as the ratio of the MFR measured at 230° C./21.6 kg and at 230° C./2.16 kg, of greater than 30.

Embodiment 17: The process of any of Embodiments 1 through 16, wherein the first ethylene-α-olefin copolymer has a Melt Flow Rate (MFR) of at least about 1.5 g/10 min, as measured by ASTM D 1238 condition L (230° C./2.16 kg).

Embodiment 18: The process of any of Embodiments 1 through 17, wherein the first and second ethylene-α-olefin copolymer each comprise one or more comonomers selected from the group consisting of $C_3$-$C_{20}$ alpha-olefins.

Embodiment 19: The process of any of Embodiments 1 through 18, wherein the first and second ethylene-α-olefin copolymer each comprise propylene comonomers.

Embodiment 20: The process of any of Embodiments 1 through 19, wherein the polymer composition comprises about 40 wt % to about 60 wt % of the first ethylene-α-olefin copolymer (a) and about 60 wt % to about 40 wt % of the second ethylene-α-olefin copolymer (b) based upon the total amount of (a) and (b) in the composition.

Embodiment 21: The process of any of Embodiments 1 through to 20, wherein the weight average molecular weight of at least one of the first ethylene-α-olefin copolymer and the second ethylene-α-olefin copolymer is about 60,000 g/mol to about 120,000 g/mol.

Embodiment 22: The process of any of Embodiments 1 through to 21, wherein the molecular weight distribution of at least one of the first and second ethylene-α-olefin copolymers is less than about 2.5.

Embodiment 23: The process of any of Embodiments 1 through 22, wherein the ethylene content of the first ethylene-α-olefin copolymer is from about 63 to about 77 wt %.

Embodiment 24: The process of any of Embodiments 1 through 23, wherein the second ethylene-α-olefin copolymer has an ethylene content from about 42 to about 54 wt %.

Embodiment 25: A polymer composition made according to the process of any of Embodiments 1 through 24.

Further embodiments of the present disclosure may include compositions made according to the process of any of Embodiments 1 through 24, such as the following compositions:

Embodiment A: A polymer composition, preferably one prepared according to the process of any of Embodiments 1-24, comprising:
(a) a first ethylene-α-olefin copolymer and
(b) a second ethylene-α-olefin copolymer, wherein
(c) the first ethylene-α-olefin copolymer (a) has an ethylene content from about 60 to about 80 wt %;
(d) the second ethylene-α-olefin copolymer (b) has an ethylene content of less than about 60 wt %; and
(e) the first ethylene-α-olefin copolymer (a) has a Melt Flow Rate Ratio (MFRR), defined as the ratio of the MFR measured at 230° C./21.6 kg and at 230° C./2.16 kg of greater than 30 and optionally has a Melt Flow Rate (MFR) of at least about 1.5 g/10 min measured by ASTM D 1238 condition L (230° C./2.16 kg).

Embodiment B: The polymer composition of Embodiment A, wherein the second ethylene-α-olefin copolymer has an ethylene content from about 42 to about 54 wt %.

Embodiment C: The polymer composition of any of Embodiments A and B, wherein the first and second ethylene-α-olefin copolymer each comprise one or more comonomers selected from the group consisting of $C_3$-$C_{20}$ alpha-olefins.

Embodiment D: The polymer composition of Embodiment C, wherein the first and second ethylene-α-olefin copolymer each comprise propylene.

Embodiment E: The polymer composition of any of Embodiments A to D, wherein the composition comprises from about 30 wt % to about 70 wt % of the first ethylene-α-olefin copolymer (a) and about 70 wt % to about 30 wt % of the second ethylene-α-olefin copolymer (b) based upon the total amount of (a) and (b) in the composition.

Embodiment F: The polymer composition of any of Embodiments A to D, wherein the composition comprises about 40 wt % to about 60 wt % of the first ethylene-α-olefin copolymer (a) and about 60 wt % to about 40 wt % of the second ethylene-α-olefin copolymer (b) based upon the total amount of (a) and (b) in the composition.

Embodiment G: The polymer composition of any of Embodiments A to E, wherein the composition comprises about 50 to about 54 wt % of the first ethylene-α-olefin copolymer (a) and about 46 to about 50 wt % of the second ethylene-α-olefin copolymer (b) based upon the total amount of (a) and (b) in the composition.

Embodiment H: The polymer composition of any of Embodiments A to G, wherein the weight average molecular weight of the first ethylene-α-olefin copolymer is about 60,000 g/mol to about 120,000 g/mol.

Embodiment I: The polymer composition of any of Embodiments A to H, wherein the weight average molecular weight of the second ethylene-α-olefin copolymer is about 60,000 g/mol to about 120,000 g/mol.

Embodiment J: The polymer composition of any of Embodiments A to I, wherein the weight average molecular weight of the composition of the first ethylene-α-olefin copolymer and second ethylene-α-olefin copolymer is about 60,000 g/mol to about 120,000 g/mol.

Embodiment K: The polymer composition of any of Embodiments A to J, wherein the molecular weight distributions of each of the first and second ethylene-α-olefin copolymers are less than about 2.5.

Embodiment L: The polymer composition of any of Embodiments A to K, wherein the first and second ethylene-α-olefin copolymers are metallocene catalyzed ethylene-α-olefin copolymers Embodiment M: The polymer composition of any of Embodiments A to L, the first ethylene-α-olefin copolymer (a) has both a MFR of at least about 1.5 g/10 min measured by ASTM D 1238 condition L (230° C./2.16 kg) and a MFRR, defined as the ratio of the MFR measured at 230° C./21.6 kg and at 230° C./2.16 kg, of greater than 30.

Embodiment N: The polymer composition of any of Embodiments A to L, the first ethylene-α-olefin copolymer (a) has both a MFR of at least about 1.6 g/10 min measured by ASTM D 1238 condition L (230° C./2.16 kg) and a MFRR, defined as the ratio of the MFR measured at 230° C./21.6 kg and at 230° C./2.16 kg, of greater than 34.

Embodiment O: The polymer composition of any of Embodiments A to M, wherein the ethylene content of the first ethylene-α-olefin copolymer is from about 63 to about 77 wt %.

Embodiment P: The polymer composition of any of Embodiments A to 0, wherein the ethylene content of second ethylene-α-olefin copolymer is less than about 55 wt %.

Embodiment Q: The polymer composition of any of Embodiments A to P, wherein the MFR of the first ethylene-α-olefin copolymer is up to about 6.5 g/10 min. measured by ASTM D 1238 condition L (230° C./2.16 kg).

Embodiment R: The polymer composition of any of Embodiments A to Q, wherein the MFRR of the first ethylene-α-olefin copolymer, defined as the ratio of the MFR measured at 230° C./21.6 kg and at 230° C./2.16 kg, is up to about 55.

Embodiment S: A lubricating oil composition comprising (i) a lubricating oil basestock, and (ii) a polymer composition comprising:
(a) a first ethylene-α-olefin copolymer and
(b) a second ethylene-α-olefin copolymer, wherein
(c) the first ethylene-α-olefin copolymer (a) has an ethylene content from about 60 to about 80 wt %;

(d) the second ethylene-α-olefin copolymer (b) has an ethylene content of less than about 60 wt %; and (e) the first ethylene-α-olefin copolymer (a) has a Melt Flow Rate Ratio (MFRR), defined as the ratio of the MFR measured at 230° C./21.6 kg and at 230° C./2.16 kg, of greater than 30 and optionally has a Melt Flow Rate (MFR) of at least about 1.5 g/10 min measured by ASTM D 1238 condition L (230° C./2.16 kg).

Embodiment T: The lubricating oil composition of Embodiment S, wherein the second ethylene-α-olefin copolymer has an ethylene content from about 42 to about 54 wt %.

Embodiment U: The lubricating oil composition of any of Embodiments S and T, wherein the first and second ethylene-α-olefin copolymer each comprise one or more comonomers selected from the group consisting of $C_3$-$C_{20}$ alpha-olefins.

Embodiment V: The lubricating oil composition of any of Embodiments S and T, wherein the first and second ethylene-α-olefin copolymer each comprise propylene.

Embodiment W: The lubricating oil composition of any of Embodiments S to V, wherein the polymer composition comprises from about 30 wt % to about 70 wt % of the first ethylene-α-olefin copolymer (a) and about 70 wt % to about 30 wt % of the second ethylene-α-olefin copolymer (b) based upon the total amount of (a) and (b) in the polymer composition.

Embodiment X: The lubricating oil composition of any of Embodiments S to V, wherein the polymer composition comprises about 60 wt % to about 40 wt % of the first ethylene-α-olefin copolymer (a) and about 40 wt % to about 60 wt % of the second ethylene-α-olefin copolymer (b) based upon the total amount of (a) and (b) in the polymer composition.

Embodiment Y: The lubricating oil composition of any of Embodiments S to V, wherein the polymer composition comprises about 50 to 54 wt % of the first ethylene-α-olefin copolymer (a) and about 50 to about 46 wt % of the second ethylene-α-olefin copolymer (b) based upon the total amount of (a) and (b) in the polymer composition.

Embodiment Z: The lubricating oil composition of any of Embodiments S to Y, wherein the weight average molecular weight of the first ethylene-α-olefin copolymer is about 60,000 g/mol to about 120,000 g/mol.

Embodiment AA: The lubricating oil composition of any of Embodiments S to Z, wherein the weight average molecular weight of the second ethylene-α-olefin copolymer is about 60,000 g/mol to about 120,000 g/mol.

Embodiment BB: The lubricating oil composition of any of Embodiments S to AA, wherein the weight average molecular weight of the composition of the first ethylene-α-olefin copolymer and second ethylene-α-olefin copolymer is about 60,000 g/mol to about 120,000 g/mol.

Embodiment CC: The lubricating oil composition of any of Embodiments S to BB, wherein the molecular weight distributions of the first and second ethylene-α-olefin copolymers are less than about 2.5.

Embodiment DD: The lubricating oil composition of any of Embodiments S to CC, wherein the first and second ethylene-α-olefin copolymers are metallocene catalyzed ethylene-α-olefin copolymers.

Embodiment EE: The lubricating oil composition of any of Embodiments S to DD, wherein the first ethylene-α-olefin copolymer (a) has both a MFR of at least about 1.5 g/10 min measured by ASTM D 1238 condition L (230° C./2.16 kg) and a MFRR, defined as the ratio of the MFR measured at 230° C./21.6 kg and at 230° C./2.16 kg, of greater than 30.

Embodiment FF: The lubricating oil composition of any of Embodiments S to EE, wherein the first ethylene-α-olefin copolymer (a) has both a MFR of at least about 1.6 g/10 min measured by ASTM D 1238 condition L (230° C./2.16 kg) and a MFRR, defined as the ratio of the MFR measured at 230° C./21.6 kg and at 230° C./2.16 kg, of greater than 34.

Embodiment GG: The lubricating oil composition of any of Embodiments S to FF, wherein (a) the first ethylene-α-olefin copolymer has a MFRR, defined as the ratio of the MFR measured at 230° C./21.6 kg and at 230° C./2.16 kg, of greater than 30, and (b) the lubricating oil composition has a shear stability index of less than 20.

Embodiment HH: The lubricating oil composition of any of Embodiments S to GG, wherein the lubricating oil composition has a shear stability index of about 20 to about 26.

Embodiment II: The lubricating oil composition of any of Embodiments S to HH, wherein the ethylene content of the first ethylene-α-olefin copolymer is from about 63 to about 77 wt %.

Embodiment JJ: The lubricating oil composition of any of Embodiments S to II, wherein the ethylene content of the second ethylene-α-olefin copolymer is less than about 55 wt %.

Embodiment KK: The lubricating oil composition of any of Embodiments S to JJ, wherein the MFR of the first ethylene-α-olefin copolymer is up to about 6.5 g/10 min., measured by ASTM D 1238 condition L (230° C./2.16 kg).

Embodiment LL: The lubricating oil composition of any of Embodiments S to KK, wherein the MFRR of the first ethylene-α-olefin copolymer, defined as the ratio of the MFR measured at 230° C./21.6 kg and at 230° C./2.16 kg, is up to about 55.

Embodiment MM: The lubricating oil composition of any of Embodiments S to LL, wherein the MFRR of the first ethylene-α-olefin copolymer, defined as the ratio of the MFR measured at 230° C./21.6 kg and at 230° C./2.16 kg, is up to about 55.39.

Embodiment NN: The lubricating oil composition of any of Embodiments S to MM, wherein the lubricating oil composition has a gel rating of 0 to 1, according to the visual gelation test.

Embodiment OO: A method for reducing gelation in a lubricating oil composition which comprises obtaining a first ethylene-α-olefin copolymer as defined in any of Embodiments A to R, a second ethylene-α-olefin copolymer as defined in any of Embodiments A to R, and a lubricating oil basestock and combining said first ethylene-α-olefin copolymer, said second ethylene-α-olefin copolymer and said lubricating oil basestock.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values take into account experimental error and variations that would be expected by a person having ordinary skill in the art.

The term "comprising" (and its grammatical variations) as used herein is used in the inclusive sense of "having" or "including" and not in the exclusive sense of "consisting only of" The terms "a" and "the" as used herein are understood to encompass the plural as well as the singular.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

While the foregoing is directed to embodiments of the present disclosure, other and further embodiments of the invention may be devised without departing from the basic scope thereof, and the scope thereof is determined by the claims that follow.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

We claim:

1. A process for making a polymer composition comprising the steps of:
   (a) feeding (i) a first ethylene monomer, (ii) a first α-olefin comonomer, (iii) a first solvent, (iv) optionally a first hydrogen, and (v) a first metallocene catalyst, in a first polymerization reaction zone to produce a first ethylene-α-olefin copolymer;
   (b) feeding (ii) a second ethylene monomer, (ii) a second α-olefin comonomer, (iii) a second solvent, (iv) optionally a second hydrogen, and (v) a second metallocene catalyst, in a second polymerization reaction zone to produce a second ethylene-α-olefin copolymer; and
   (c) combining the first ethylene-α-olefin copolymer and the second ethylene-α-olefin copolymer to form a polymer composition,
   wherein the first ethylene-a-olefin copolymer has an ethylene content from about 60 to about 80 wt %, and the second ethylene-α-olefin copolymer has an ethylene content of from about 42 to about 60 wt %,
   wherein the polymer composition has a total ethylene content of from about 50 to about 70 wt %,
   wherein the temperature in the first polymerization reaction zone and the temperature in the second polymerization reaction zone differ by less than 10° C.; and
   wherein the process meets at least one of the following:
   (1) the first hydrogen is fed in step (a) at a first hydrogen feed concentration of 0.0-1.0 wt %, by total weight of (a)(i)-(iv) fed in step (a); and
   (2) the second hydrogen is fed in step (b) at a second hydrogen feed concentration of 0.0-0.5 wt %, by total weight of (b)(i)-(iv) fed in step (b).

2. The process of claim 1, wherein the polymer composition comprises:
   (a) a first ethylene-α-olefin copolymer and
   (b) a second ethylene-α-olefin copolymer, wherein
   (c) the first ethylene-α-olefin copolymer (a) has an ethylene content from about 60 to about 80 wt %;
   (d) the second ethylene-α-olefin copolymer (b) has an ethylene content of less than about 60 wt %; and
   (e) the first ethylene-α-olefin copolymer (a) has a Melt Flow Rate Ratio (MFRR), defined as the ratio of the MFR measured at 230° C./21.6 kg and at 230° C./2.16 kg, of greater than 30, and optionally has a Melt Flow Rate (MFR) of at least about 1.5 g/10 min, as measured by ASTM D 1238 condition L (230° C/2.16 kg).

3. The process of claim 2, wherein the first ethylene-α-olefin copolymer has a Melt Flow Rate (MFR) of at least about 1.5 g/10 min, as measured by ASTM D 1238 condition L (230° C/2.16 kg).

4. The process of claim 1, wherein the temperature in the first polymerization reaction zone and the temperature in the second polymerization reaction zone differ by less than 5° C.

5. The process of claim 1, wherein the ethylene conversion rate % in the first polymerization reaction zone and the ethylene conversion rate % in the second polymerization reaction zone differ by at least 5%.

6. The process of claim 1, wherein the ethylene conversion rate % in the first polymerization reaction zone and the ethylene conversion rate % in the second polymerization reaction zone differ by at least 10%.

7. The process of claim 1, wherein the first hydrogen feed concentration is 0.0-1.0 wt % by total weight of (a)(i)-(iv) fed in step (a), and the second hydrogen feed concentration is 0.0-0.5 wt % by total weight of (b)(i)-(iv) fed in step (b).

8. The process of claim 1, wherein the first hydrogen feed concentration is 0.0-0.5 wt % by total weight of (a)(i)-(iv) fed in step (a).

9. The process of claim 1, wherein at least one of the first and second hydrogen feed concentrations is 0.0-0.2 wt %, by total weight of (a)(i)-(iv) fed in step (a) for the first hydrogen feed concentration and by total weight of (b)(i)-(iv) fed in step (b) for the second hydrogen feed concentration.

10. The process of claim 1, wherein the first hydrogen feed concentrations is 0.0 wt % by total weight of (a)(i)-(iv) fed in step (a).

11. The process of claim 1, wherein the first hydrogen feed concentration is 0.0 wt % by total weight of (a)(i)-(iv) fed in step (a), and the second hydrogen feed concentration is 0.0-0.2 wt % by total weight of (b)(i)-(iv) fed in step (b).

12. The process of claim 1, wherein at least one of the first and second solvents comprises hexane or isomers of hexane.

13. The process of claim 1, wherein at least one of the first and second metallocene catalyst comprises a transition metal compound having a formula:

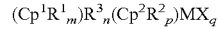

where $Cp^1$ of ligand $(Cp^1R^1{}_m)$ and $Cp^2$ of ligand $(Cp^2R^2{}_p)$ are the same or different cyclopentadienyl rings; $R^1$ and $R^2$ each is, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; and two $R^1$ and/or $R^2$ substituents on adjacent carbon atoms of the cyclopentadienyl ring associated there with can be joined together to form a ring containing from 4 to about 20 carbon atoms; $R^3$ is a bridging group; n is the number of atoms in the direct chain between the two ligands and is 0 to 8; M is a transition metal having a valence of from 3 to 6; each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; q is equal to the valence of M minus 2; or

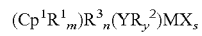

wherein R¹ is, each independently, a halogen or a hydrocarbyl, halocarbyl, hydrocarbyl-substituted organometalloid or halocarbyl-substituted organometalloid group containing up to about 20 carbon atoms; m is 0 to 5; and two R¹ substituents on adjacent carbon atoms of the cyclopentadienyl ring associated therewith can be joined together to form a ring containing from 4 to about 20 carbon atoms; R³ is a bridging group; n is 0 to 3; M is a transition metal having a valence of from 3 to 6; Y is a heteroatom containing group in which the heteroatom is an element with a coordination number of three from Group VA or a coordination number of two from group VIA; R² is a radical selected from a group consisting of $C_1$ to $C_{20}$ hydrocarbon radicals, substituted $C_1$ to $C_{20}$ hydrocarbon radicals, where one or more hydrogen atoms is replaced with a halogen atom, and when Y is three coordinate and unbridged there may be two R groups on Y each independently a radical selected from a group consisting of $C_1$ to $C_{20}$ hydrocarbon radicals, substituted $C_1$ to $C_{20}$ hydrocarbon radicals, where one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; s is equal to the valence of M minus 2; and y is 1 if Y is a heteroatom containing group in which the heteroatom is an element with a coordination number of three from Group VA, and y is 0 if Y is a heteroatom containing group in which the heteroatom is an element with a coordination number of two from group VIA.

14. The process of claim 13, wherein X=R, and at least one of the first and second metallocene catalyst comprises a transition metal compound that is at least one of μ-$(C_6H_5)_2$C(cyclopentadienyl)(fluorenyl)M$(R)_2$, μ-$(C_6H_5)_2$C(3-methylcyclopentadienyl)(fluorenyl)M$(R)_2$, μ-$(CH_3)_2$C(cyclopentadienyl)(fluorenyl)M$(R)_2$, μ-$(C_6H_5)_2$C(cyclopentadienyl)(2-methylindenyl)M$(R)_2$, μ-$(C_6H_5)_2$C(3-methylcyclopentadienyl)(2-methylindenyl)M$(R)_2$, μ-$(C_6H_5)_2$C(cyclopentadienyl)(2,7-dimethylfluorenyl)M$(R)_2$ and μ-$(CH_3)_2$C(cyclopentadienyl)(2,7-dimethylfluorenyl)M$(R)_2$; wherein M is chosen form a group consisting of Zr and Hf, and R is chosen from a group consisting of Cl and $CH_3$.

15. The process of claim 1, wherein the at least one of the first and second metallocene catalyst comprises a transition metal compound that is at least one of μ-dimethylsilylbis(indenyl)hafniumdimethyl, μ-dimethylsilylbis(indenyl)zirconiumdimethyl, (μ-dimethylsilyl)bis(2-methyl-4-(3′,5′-di-tert-butylphenyl)indenyl)zirconiumdimethyl, (μ-dimethylsilyl)bis(2-methyl-4-(3,′5′-di-tert-butylphenyl) indenyl)hafniumdimethyl, (μ-dimethylsilyl)bis(2-methyl-4-naphthylindenyl)-zirconiumdimethyl, (μ-dimethylsilyl)bis (2-methyl-4-naphthylindenyl)hafniumdimethyl, (μ-dimethylsilyl)bis(2-methyl-4-(N-carbazyl)indenyl)zirconiumdimethyl, (μ-dimethylsilyl)-bis(2-methyl-4-(N-carbazyl)indenyl)hafniumdimethyl, dimethylsilyl bis(2-(methyl)-5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f)indenyl)hafnium dimethyl, diphenylsilyl bis(5,5,8,8-tetramethyl-5,6,7,8-tetrahydrobenz(f)indenyl)hafnium dimethyl, diphenylsilyl bis (2-(methyl)-5,5,8,8-tetramethyl-5,6,7,8-tetrahydrobenz(f) indenyl)zirconium dichloride, cyclo-propylsilyl bis(2-(methyl)-5,5,8,8-tetramethyl-5,6,7,8-tetrahydrobenz(f) indenyl)-hafnium dimethyl, and μ-(di-(p-triethylsilylphenyl) methane)(cyclopentadienyl)(2,7-di-t-butylfluorenyl) hafnium dimethyl.

16. The process of claim 1, wherein at least one of the first and second polymerization reaction zones further comprises an activator that is at least one of N,N-dimethylaniliniumtetrakis(perfluorophenyl)borate, N,N-dimethylanilinium-tetrakis(perfluoronaphthyl)borate, N,N-dimethylanilinium-tetrakis(perfluorobiphenyl)borate, N,N-dimethylaniliniumtetrakis (3 ,5-bis(trifluoromethyl)phenyl)borate, triphenylcarbenium-tetrakis(perfluorophenyl)borate, triphenylcarbenium-tetrakis(perfluoronaphthyl)borate, triphenylcarbenium-tetrakis(perfluorobiphenyl)borate, triphenyl-carbenium-tetrakis(3,5-bis(trifluoro-methyl)phenyl)borate, aluminoxanes, alumoxanes, and aluminum alkyls.

17. The process of claim 13, wherein X=R, and the first and second metallocene catalysts comprise a transition metal compound that is at least one of μ-$(C_6H_5)_2$C(cyclopentadienyl)(fluorenyl)M$(R)_2$, μ-$(C_6H_5)_2$C(3-methylcyclopentadienyl)(fluorenyl)M$(R)_2$, μ-$(CH_3)_2$C(cyclopentadienyl)(fluorenyl)M$(R)_2$, μ-$(C_6H_5)_2$C(cyclopentadienyl)(2-methylindenyl)M$(R)_2$, μ-$(C_6H_5)_2$C(3-methylcyclopentadienyl)(2-methylindenyl)M$(R)_2$, μ-$(C_6H_5)_2$C(cyclopentadienyl)(2,7-dimethylfluorenyl)M$(R)_2$ and μ-$(CH_3)_2$C(cyclopentadienyl)(2,7-dimethylfluorenyl)M$(R)_2$; wherein M is chosen form a group consisting of Zr and Hf, and R is chosen from a group consisting of Cl and $CH_3$.

18. The process of claim 1, wherein the first and second polymerization reaction zones further comprise an activator that is at least one of N,N-dimethylanilinium-tetrakis(perfluorophenyl)borate, N,N-dimethylanilinium-tetrakis(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbeniumtetrakis(perfluorophenyl)borate, triphenylcarbenium-tetrakis (perfluoronaphthyl)borate, triphenyl-carbenium-tetrakis (perfluorobiphenyl)borate, triphenylcarbenium-tetrakis(3,5-bis(trifluoro-methyl) phenyl)borate, aluminoxanes, alumoxanes, and aluminum alkyls.

19. The process of claim 1, wherein the first and second polymerization conditions are in solution phase.

20. The process of claim 1, wherein the first and second polymerization reaction zones are in series.

21. The process of claim 1, wherein the first and second ethylene-α-olefin copolymer each comprise one or more comonomers selected from the group consisting of $C_3$-$C_{20}$ alpha-olefins.

22. The process of claim 1, wherein the first and second ethylene-α-olefin copolymer each comprise propylene comonomers.

23. The process of claim 1, wherein the polymer composition comprises about 40 wt % to about 60 wt % of the first ethylene-α-olefin copolymer (a) and about 60 wt % to about 40 wt % of the second ethylene-α-olefin copolymer (b) based upon the total amount of (a) and (b) in the polymer composition.

24. The process of claim 1, wherein the ethylene content of the first ethylene-α-olefin copolymer is from about 63 to about 77 wt %.

25. The process of claim 1, wherein the second ethylene-α-olefin copolymer has an ethylene content from about 42 to about 54 wt %.

26. The process of claim 1, wherein the temperature in the first polymerization reaction zone is from 110° C. to 150° C. and the temperature in the second polymerization reaction zone is from 100° C. to 150° C.

\* \* \* \* \*